US 8,681,864 B2

(12) United States Patent
Kazui

(10) Patent No.: US 8,681,864 B2
(45) Date of Patent: Mar. 25, 2014

(54) VIDEO CODING APPARATUS AND VIDEO CODING CONTROL METHOD

(75) Inventor: Kimihiko Kazui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 398 days.

(21) Appl. No.: 13/137,792

(22) Filed: Sep. 13, 2011

(65) Prior Publication Data

US 2012/0002725 A1     Jan. 5, 2012

Related U.S. Application Data

(63) Continuation of application No. PCT/JP2009/055487, filed on Mar. 19, 2009.

(51) Int. Cl.
*H04N 7/12* (2006.01)
*H04N 11/02* (2006.01)
*H04N 11/04* (2006.01)

(52) U.S. Cl.
USPC .............. 375/240.12; 375/240.15; 348/394.1; 348/404.1; 348/412.1; 348/415.1

(58) Field of Classification Search
USPC .......... 375/240.01–240.29; 348/394.1, 404.1, 348/412.1, 415.1, 424.1; 382/234, 238
See application file for complete search history.

(56) References Cited

U.S. PATENT DOCUMENTS

| 7,599,434 | B2 * | 10/2009 | Reynolds et al. | ........ 375/240.01 |
| 2005/0123058 | A1 | 6/2005 | Greenbaum et al. | |
| 2005/0243922 | A1 * | 11/2005 | Magee et al. | ............ 375/240.12 |

FOREIGN PATENT DOCUMENTS

| GB | 2395387 | 5/2004 | |
| JP | 8-60956 | 3/1996 | |
| JP | 8-242452 | 9/1996 | |
| JP | 11-4448 | 1/1999 | |
| JP | 2000-023154 | * 1/2000 | ............... H04N 7/24 |
| JP | 2000-23154 | 1/2000 | |
| JP | 2000-341690 | 12/2000 | |
| JP | 2003-299095 | 10/2003 | |
| JP | 2006-295492 | 10/2006 | |

OTHER PUBLICATIONS

Patent Abstracts of Japan, Publication No. 8-60956, Published Mar. 5, 1996.
Patent Abstracts of Japan, Publication No. 2000-341690, Published Dec. 8, 2000.
Patent Abstracts of Japan, Publication No. 2000-23154, Published Jan. 21, 2000.

(Continued)

*Primary Examiner* — Sath V Perungavoor
*Assistant Examiner* — Nathnael Aynalem
(74) *Attorney, Agent, or Firm* — Staas & Halsey LLP

(57) ABSTRACT

In a video coding apparatus, a plurality of coding units perform compression coding of a single source stream of video data. A control unit controls those coding units in such a way that all the coding units produce respective interframe coded pictures with identical playback times as a first-coded picture in a picture group (e.g., GOP) and produce identical local decoded pictures based on the respective intraframe coded pictures. A selection decision unit makes a selection, for each picture group, of one of the coded video data from the coding units on the basis of their coding results. According to this selection, a selection unit selectively outputs one of the coded video data. This output switching operation is performed at a point immediately before a forward interframe predictive coded picture that appears first of those in a picture group included in each of the coded video data outputs being switched.

10 Claims, 16 Drawing Sheets

(56) References Cited

OTHER PUBLICATIONS

Patent Abstracts of Japan, Publication No. 2006-295492, Published Oct. 26, 2006.
Patent Abstracts of Japan, Publication No. 8-242452, Published Sep. 17, 1996.
Patent Abstracts of Japan, Publication No. 2003-299095, Published Oct. 17, 2003.
Patent Abstracts of Japan, Publication No. 11-4448, Published Jan. 6, 1999.
International Search Report for PCT/JP2009/055487, mailed Jun. 23, 2009.
Extended Supplementary European Search Report issued Jan. 30, 2013, in corresponding European Patent Application No. 09841875.9.

* cited by examiner

FIG. 4

| CODED VIDEO DATA | B-4 | P0 | B-2 | B-1 | I3 | B1 | B2 | P6 | B4 | B5 | P9 | B7 | B8 | P12 | B10 | B11 | I15 | B13 | B14 | P18 | B16 |
|---|---|---|---|---|---|---|---|---|---|---|---|---|---|---|---|---|---|---|---|---|---|
| frame_num | 9 | 9 | 10 | 10 | 10 | 11 | 11 | 11 | 12 | 12 | 12 | 13 | 13 | 13 | 14 | 14 | 14 | 15 | 15 | 15 | 16 |

__US 8,681,864 B2__

VIDEO CODING APPARATUS AND VIDEO CODING CONTROL METHOD

This application is a continuing application, filed under 35 U.S.C.§111(a), of International Application PCT/JP2009/055487, filed on Mar. 19, 2009.

FIELD

The embodiments discussed herein relate to a video coding apparatus for coding video data into a compressed form, as well as to a video coding control method for controlling such a compression coding process.

BACKGROUND

Video data is generally large in size and thus often encoded into a compressed form for transmission from a sending device to a receiving device or for storing in a data storage device. Typical compression coding methods for video data are MPEG-1, MPEG-2, MPEG-4, and MPEG-4 AVC/H.264 (hereafter, simply called "H.264") standardized by the Moving Picture Experts Group (MPEG).

Those compression coding methods use interframe motion prediction techniques based on the correlation between frames. When a portion having a high correlation with other frame is found, the coder encodes that portion as its spatial difference (motion vector) and pixel value differences (prediction error). Generally, video data has a high degree of frame-to-frame correlation. Thus the pixel differences of such correlated frames are substantially smaller than the pixel values themselves. For this reason, a high compression ratio is achieved by the use of interframe motion prediction coding.

To implement the interframe motion prediction coding, the above-noted compression coding methods define three types of pictures, i.e., I-pictures, P-pictures, and B-pictures. I-pictures, or Intra pictures, are encoded not with interframe predictive coding techniques, but with intraframe predictive coding techniques. P-pictures, or forward predicted pictures, are encoded with reference to, in general, a previous picture. B-pictures, or bidirectional predicted pictures, are encoded with reference to, in general, both previous and later pictures.

The above-noted compression coding methods also define "Group of Pictures" (GOP) for ease of random access. H.264 does not define GOP per se, but uses similar structures. In a GOP, the coding is supposed to begin with an I-picture. The remaining part of the GOP includes P-pictures and B-pictures. Typically, one to four B-pictures are inserted between two P-pictures. While the arrangement of picture types (I, P, B) is usually in a fixed pattern, there is also a coding method that allows any frame to be encoded as an I-frame (see, for example, Japanese Laid-open Patent Publication No. 8-60956).

There are two types of GOP, called "open GOP" and "closed GOP." FIG. 15 explains a structure of open GOP. FIG. 16 explains a structure of closed GOP.

The upper halves of FIGS. 15 and 16 depict a sequence of pictures constituting a source video stream, each individual picture being added a number that indicates in what order those pictures are supposed to be played back. The lower halves of FIGS. 15 and 16 depict a sequence of pictures constituting coded video data, each individual picture being designated by a picture type and a frame number. The frame number indicates from which picture in the source video data the frame has been coded. For example, picture "I2" in FIG. 15 is an I-picture corresponding to picture "2" in the source video data.

In the example of FIG. 15, twelve pictures numbered "0" to "11" constitute a GOP. In the case of open GOP, the pictures in a GOP may be encoded by using reference pictures not only in the same GOP, but also other GOP (normally, immediately preceding GOP). In the example of FIG. 15, two coded pictures "B0" and "B1" make reference to picture "P-1" in their immediately preceding GOP. As can be seen from this example, open GOP allows referencing among different GOPs.

In the example of FIG. 16, on the other hand, ten pictures numbered "2" to "11" constitute a GOP. In the case of closed GOP, the pictures in a GOP are encoded by using reference pictures only in the same GOP. In the example of FIG. 16, picture "B3" is the first B picture appearing in its GOP and makes reference to picture "I2" in the same GOP.

Open GOP offers a higher coding efficiency than closed GOP. For example, the number of B-pictures contained in a coded video is relatively small in the case of closed GOP, compared with the case of open GOP.

On the other hand, closed GOP advantageously ensures that, when coded pictures are combined on a GOP basis, the resulting edited pictures can be decoded properly. This is because the decoding of a closed GOP does not depend on any other GOPs. In the case of open GOP, simply combining separately-coded GOPs together results in an incorrect video stream that cannot be decoded properly, because the coded pictures may reference to a picture in other GOP that is missing in the stream.

The above-noted compression coding methods provide many degrees of freedom in terms of how to encode each frame in a GOP. For example, the coding process may be configured with parameters that specify the interval M of P-pictures, frame structure and field structure, direct mode motion compensation (temporal direct mode and spatial direct mode), and the like. Optimal values of those parameters may vary from scene to scene. It is therefore desirable to actually execute coding with different parameters and evaluate the result for more accurate determination of optimal parameter values.

As an example of the above approach, there is proposed an apparatus that has a plurality of coding units configured with different coding parameters to encode the same given video in a parallel fashion. Depending on the scenes, an optimally coded video output is selected from among those produced by the coding units. This technique involves switching of video outputs on a GOP basis to selectively output optimal ones (see, for example, Japanese Laid-open Patent Publication No. 2000-341690, Japanese Laid-open Patent Publication No. 2000-23154, and Japanese Laid-open Patent Publication No. 2006-295492)

As described above, open GOP enables a higher coding efficiency than closed GOP. In other words, a higher picture quality can be achieved with the same amount of coded data.

The use of closed GOP, on the other hand, makes it easier to switch coded video data outputs on a GOP basis in the case where the coding is performed with a plurality of coding units as in the aforementioned apparatus. This is because the decoding of a closed GOP does not rely on any other GOPs. In the case of open GOP, however, the decoder may not be able to decode the video data produced by switching video data outputs on a GOP basis.

SUMMARY

According to an aspect of the invention, a video coding apparatus includes: a plurality of coding units to perform compression coding of a single source stream of video data by using different coding parameters; a selection decision unit to make a selection of one of coded video data outputs encoded by the coding units on a basis of coding results of the coding units, for each picture group formed from a fixed number of successive pictures including at least one intraframe coded picture; a selection unit to selectively output one of the coded video data outputs from the coding units according to the selection made by the selection decision unit; and a control unit to cause the coding units to perform the compression coding in such a way that all the coding units produce respective interframe coded pictures with identical playback times as a first-coded picture in a picture group and produce identical local decoded pictures based on the respective intraframe coded pictures; wherein the selection unit sets an output switching point at which the coded video data output of one coding unit is switched to the coded video data output of another coding unit, the output switching point being immediately before a forward interframe predictive coded picture that appears first of those in a picture group included in each of the coded video data outputs being switched.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of frame numbers added to coded video data.

DESCRIPTION OF EMBODIMENTS

Embodiments of the present invention will be described in detail below with reference to the accompanying drawings.

This description uses the term "frame" to refer to each still picture constituting a video stream. It is noted that the processing operations described below are applicable not only to frame-based video coding, but also to field-based video coding. In the former case, the processing operations described in the following section are applied to each frame. In the latter case, the same operations are applied to each two fields, i.e., top and bottom fields.

[First Embodiment]

Figure 1:
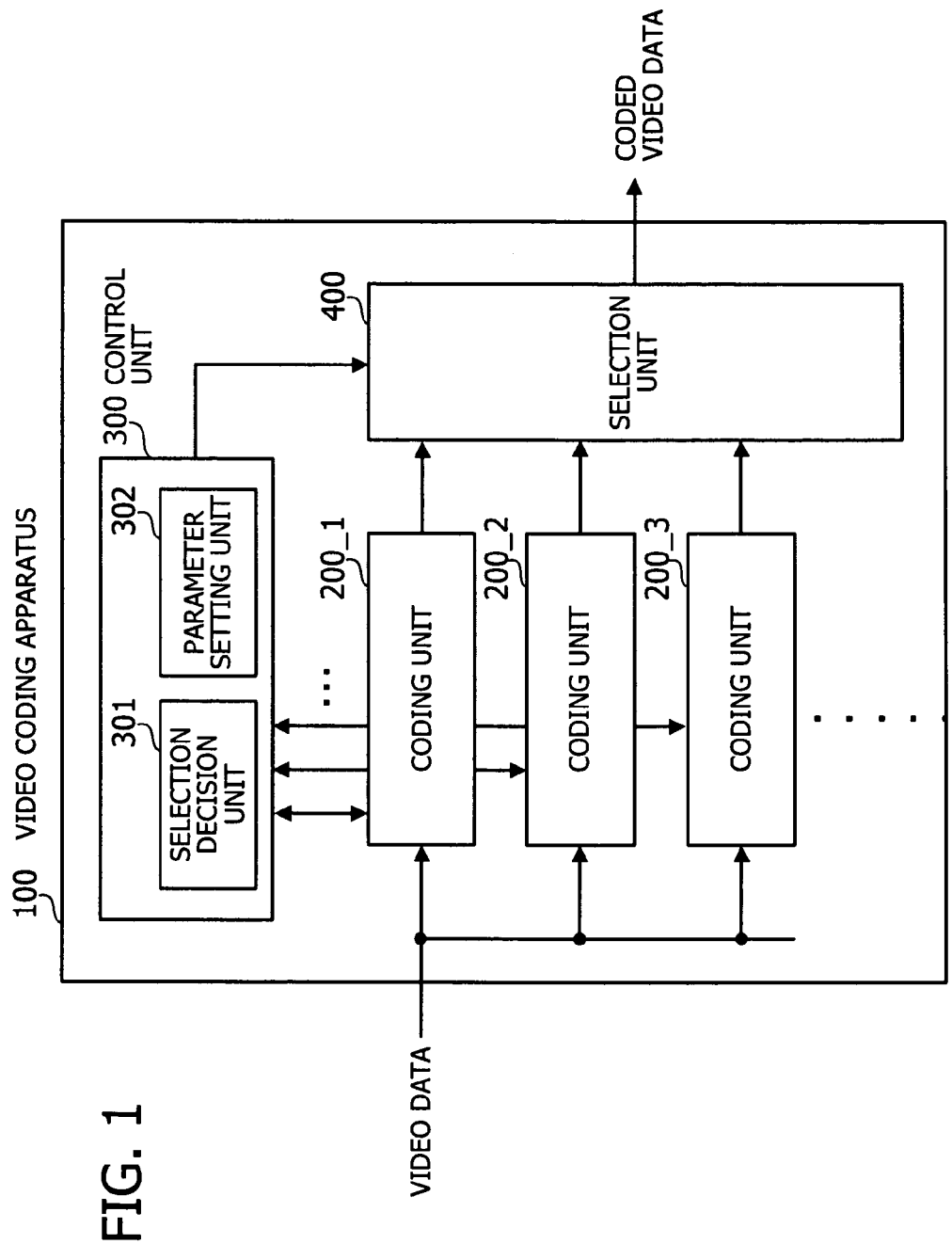
FIG. 1 illustrates an example of a video coding apparatus according to a first embodiment.

FIG. 1 illustrates an example of a video coding apparatus according to a first embodiment.

The video coding apparatus 100 illustrated in FIG. 1 is an apparatus that encodes video data into a compressed form according to a specific coding method and outputs coded video data. This video coding apparatus 100 is formed from a plurality of coding units 200_1, 200_2, 200_3, . . . , a control unit 300, and a selection unit 400.

The coding units 200_1, 200_2, 200_3, . . . perform compression coding of a single source stream of video data by using different coding parameters. An example of such coding parameters is those indicating the number of bidirectional interframe predictive coded pictures to be located between forward interframe predictive coded pictures in coded video data. Another example of coding parameters is those specifying whether to encode pictures on an individual frame basis or on an individual field basis. Yet another example of coding parameters is those specifying on what basis the motion vectors should be calculated, i.e., with reference to other coded frames or with reference to coded image areas within the current frame. It is also possible to configure the coding units 200_1, 200_2, 200_3, . . . with different values of two or more of those parameters.

The control unit 300 controls the coding units 200_1, 200_2, 200_3, . . . and the selection unit 400. According to the present embodiment, the control unit 300 includes functions of a selection decision unit 301 and a parameter setting unit 302. Those functions may, however, be implemented as separate pieces of hardware.

The selection decision unit 301 selects one of the coded video data outputs produced by the coding units 200_1, 200_2, 200_3, . . . , on the basis of their coding results. For example, the selection decision unit 301 selects one of those coded video data outputs which has the highest coding efficiency.

The selection decision unit 301 makes the above-noted selection for each picture group formed from a fixed number of successive pictures that the coding units 200_1, 200_2, 200_3, . . . have encoded. Picture groups each include at least one intraframe coded picture and may further include forward interframe predicted pictures and bidirectional interframe prediction pictures at specified intervals. For example, the selection decision unit 301 evaluates the coding result of each coding unit 200_1, 200_2, 200_3, . . . for a specific picture group to determine which data output to choose for the next picture group, from among those that the coding units 200_1, 200_2, 200_3, . . . , produce.

The parameter setting unit 302 configures each coding unit 200_1, 200_2, 200_3, . . . with various parameters for their processing. As will be described later, the parameter setting unit 302 configures all the coding units 200_1, 200_2, 200_3, . . . with one or more common coding parameters for use in coding an intraframe coded picture that is to be coded in the first place within the next picture group. Those common parameters are determined when the compression coding of a picture group is finished in the coding units 200_1, 200_2, 200_3, . . . , on the basis of a coding result of the coding unit corresponding to the coded video data output selected by the selection decision unit 301.

The selection unit 400 selectively outputs one of coded video data outputs that the coding units 200_1, 200_2, 200_3, ... have produced, according to the selection made by the selection decision unit 301 in the control unit 300.

The following section will describe in greater detail the processing operations performed by the above video coding apparatus 100, assuming that the MPEG-1/-2/-4 compression coding techniques are used in the video coding apparatus 100. According to the terminology of those coding techniques, the foregoing picture groups are called "Group of Pictures" (GOP), and the intraframe coded pictures are called "I-frames." Further, the forward interframe predictive coded pictures are called "P-frames," and the bidirectional interframe predictive coded pictures are called "B-frames."

Figure 2:
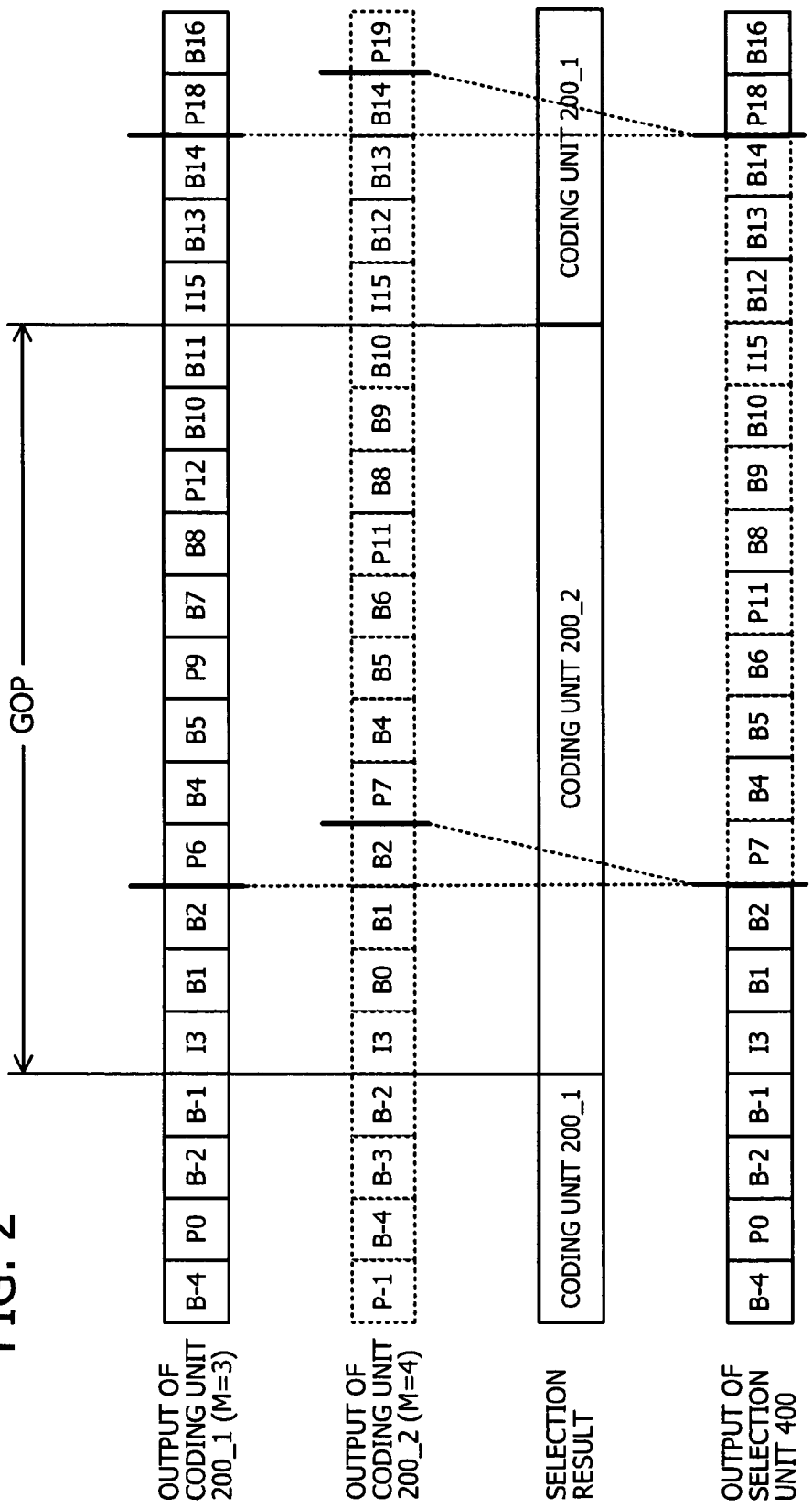
FIG. 2 illustrates selection of coded video data outputs in a video coding apparatus.

FIG. 2 illustrates selection of coded video data outputs in a video coding apparatus. It is assumed in FIG. 2 that the output data of two coding units 200_1 and 200_2 is subjected to the selection unit 400 for output switching operation.

The upper two rows of FIG. 2 represent two frame sequences of coded video data produced by each coding unit 200_1 and 200_2. The next row depicts the selection made by the selection decision unit 301 in the control unit 300. This selection result indicates which output data of the coding units 200_1 and 200_2 the selection unit 400 is supposed to select. The bottommost row illustrates a frame sequence of coded video data that the selection unit 400 actually outputs.

Figure 15:
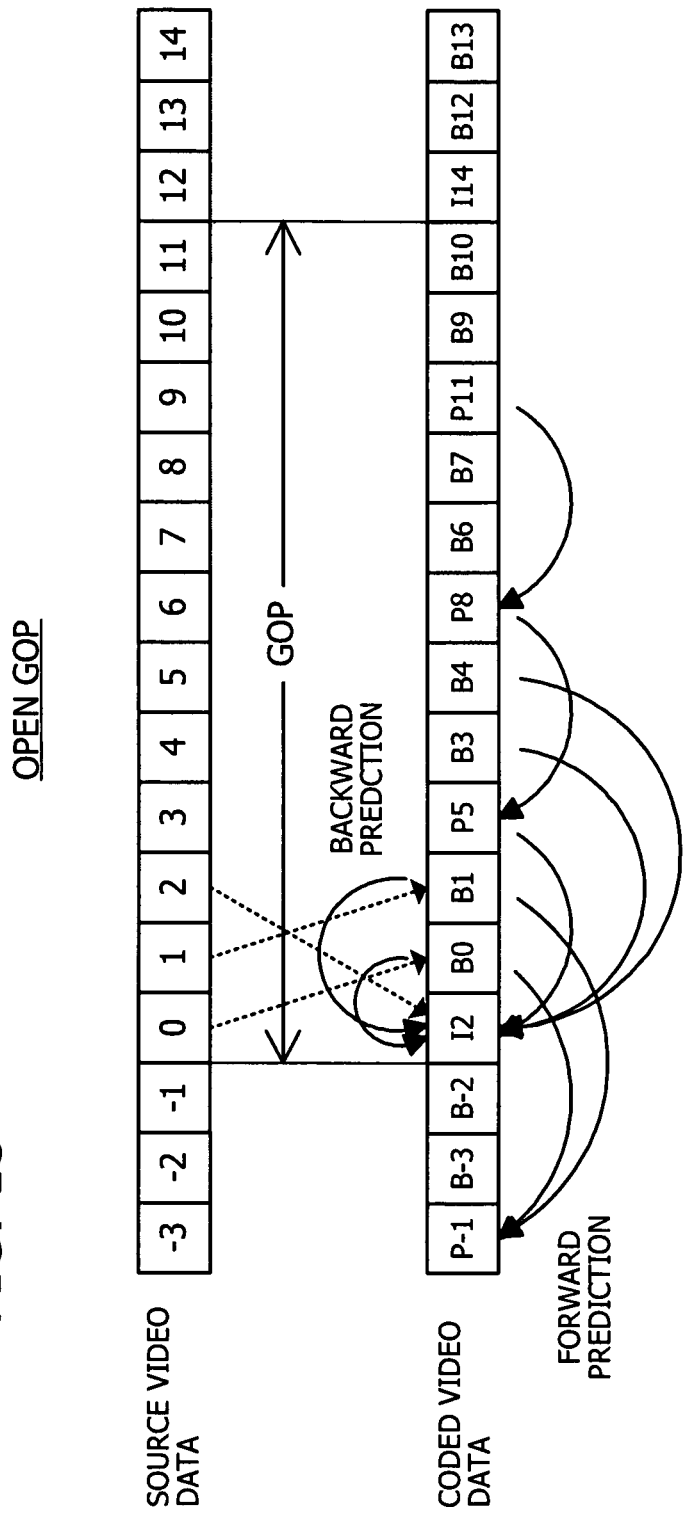
FIG. 15 explains a structure of open GOP.
Figure 16:
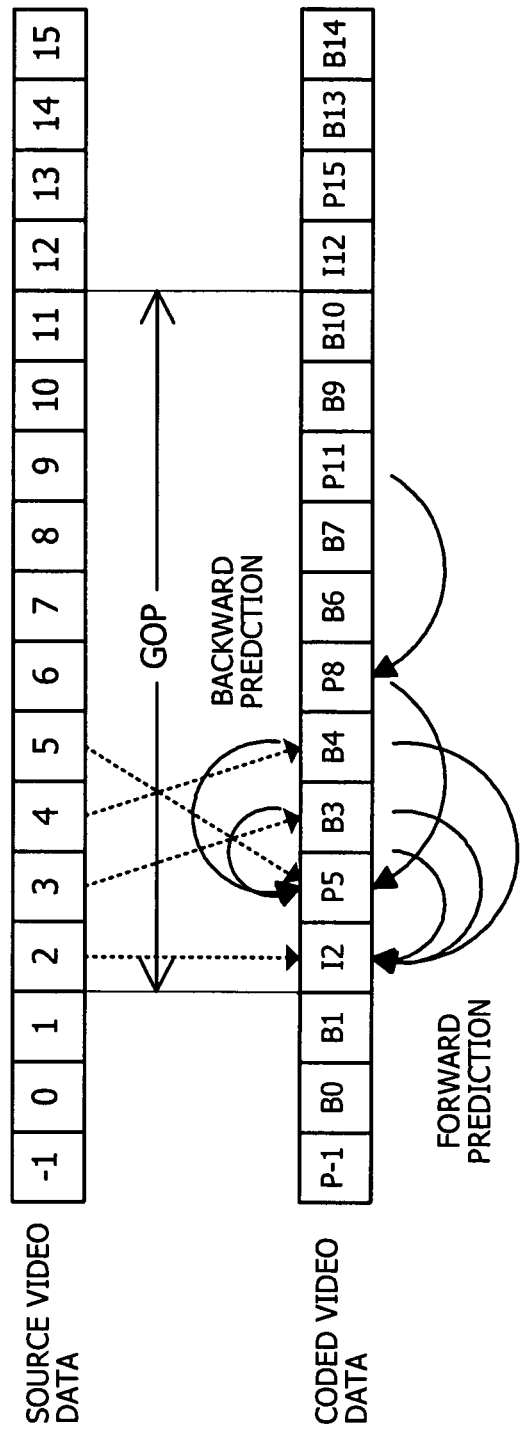
FIG. 16 explains a structure of closed GOP.

In the illustrated frame sequences, each frame is designated by a picture type and a frame number in the same way as in FIGS. 15 and 16. The frame number of an illustrated frame indicates its corresponding frame in the source video data being coded. For example, frame "I3" is an I-frame coded from frame "3" in the source video data.

The selection unit 400 actually outputs coded video data with a certain amount of delay with respect to those at the output end of coding units 200_1 and 200_2 because of the effect of a buffer (not illustrated) inside the selection unit 400. FIG. 2, however, neglects this delay for the sake of simplicity.

In FIG. 2, the coded video data produced by one coding unit 200_1 includes a 12-frame GOP, from frame "I3" to frame "B11." Similarly, the coded video data of the other coding unit 200_2 includes a 12-frame GOP, from frame "I3" to frame "B10."

The compression coding performed in the coding units 200_1 and 200_2 produces those GOPs in such a way that their respective topmost I-frames will have the same playback time (display time). For example, the coded video data outputs include frames "I3" that the coding units 200_1 and 200_2 have coded from frame "3" of the source video data. Similarly, frames "I15" are produced from frame "15" of the source video data.

Further, the coding units 200_1 and 200_2 in FIG. 2 use open GOP in their compression coding. For example, the coding unit 200_1 produces coded video data including frame "B1." This frame "B1" refers to frame "I3" in the same GOP and frame "P0" in the immediately preceding GOP. The coding unit 200_2 produces coded video data in which frame "B0" refers to frame "I3" in the same GOP and frame "P-1" in the immediately preceding GOP.

The coding units 200_1 and 200_2 perform compression coding in their respective ways by using coding parameters that specify different intervals M between P-frames. More specifically, the coding unit 200_1 is given a parameter specifying M=3, and the coding unit 200_2 is given a parameter specifying M=4.

In the case of open GOP, it is not appropriate to simply switch the coded video data outputs of two coding units 200_1 and 200_2 on a GOP basis. This is because the reference picture of a predictive-coded picture may reside in other GOP, and in that case, the decoder is unable to reproduce the correct reference picture.

According to the present embodiment, the video coding apparatus 100 is designed to make its selection unit 400 switch the coded video data outputs from coding units 200_1 and 200_2 at the point immediately before a P-frame that appears first in each GOP. The first P-frame in a GOP makes reference to the topmost I-frame in that GOP. In the example of FIG. 2, the selection decision unit 301 determines to switch from one coding unit 200_1 to the other coding unit 200_2 when outputting coded video data for the GOP beginning with frame "I3." The selection unit 400 then executes this switching as follows. The selection unit 400 first keeps selecting the video data output of the coding unit 200_1 up to frame "B2" immediately before frame "P6," which is the first P-frame in the GOP of interest. The selection unit 400 then switches its data selection to the other coding unit 200_2 by choosing frame "P7," which is the first P-frame in the GOP from the coding unit 200_2.

Further, both the coding units 200_1 and 200_2 are designed to execute compression coding in such a way that their local decoded pictures based on the topmost I-frame of a GOP contain the same data. This means that the two coding units produce their respective first P-frames in the GOP by making reference to the same picture data. The selection unit 400 switches video data output at the point immediately before the GOP's first P-frame, but the resulting video data permits the decoder to properly reproduce the original pictures without degrading their quality.

Through the processing described above, coded video data with a high picture quality is selected for output, from among the outputs of a plurality of coding units, while using the highly-efficient open GOP coding technique. It is thus possible to produce coded video data with a high coding efficiency, as well as a high quality.

For example, the video coding apparatus 100 includes a parameter setting unit 302 in its control unit 300 to provide common coding parameters for use in all coding units 200_1 and 200_2. Those common coding parameters are specified such that the coding units will produce identical local decoded pictures based on the topmost I-frame of each GOP.

The parameter setting unit 302 configures every coding unit 200_1 and 200_2 with, for example, some parameters for coding rate control used to compression coding of that I-frame. These coding rate control parameters are determined on the basis of coding results of the coding unit whose coded video data output is selected by the selection decision unit 301 at the moment when the coding of the immediately preceding GOP is finished. The output data rate of the selection unit 400 is thus controlled properly, thus enabling the decoder to receive coded video data without experiencing overflow or underflow of its input buffer.

[Second Embodiment]

An example of compression coding using H.264 will now be described below. The processing of this second embodiment may also be applicable to the cases of MPEG-1, MEPEG-2, and MPEG-4, except for the use of frame numbers in the process of compression coding.

The video coding apparatus 100 according to the present embodiment has the same fundamental structure as the one discussed in FIG. 1. That is, the video coding apparatus 100 of this embodiment includes a plurality of coding units 200_1, 200_2, 200_3, ..., a control unit 300, and a selection unit 400.

Figure 3:
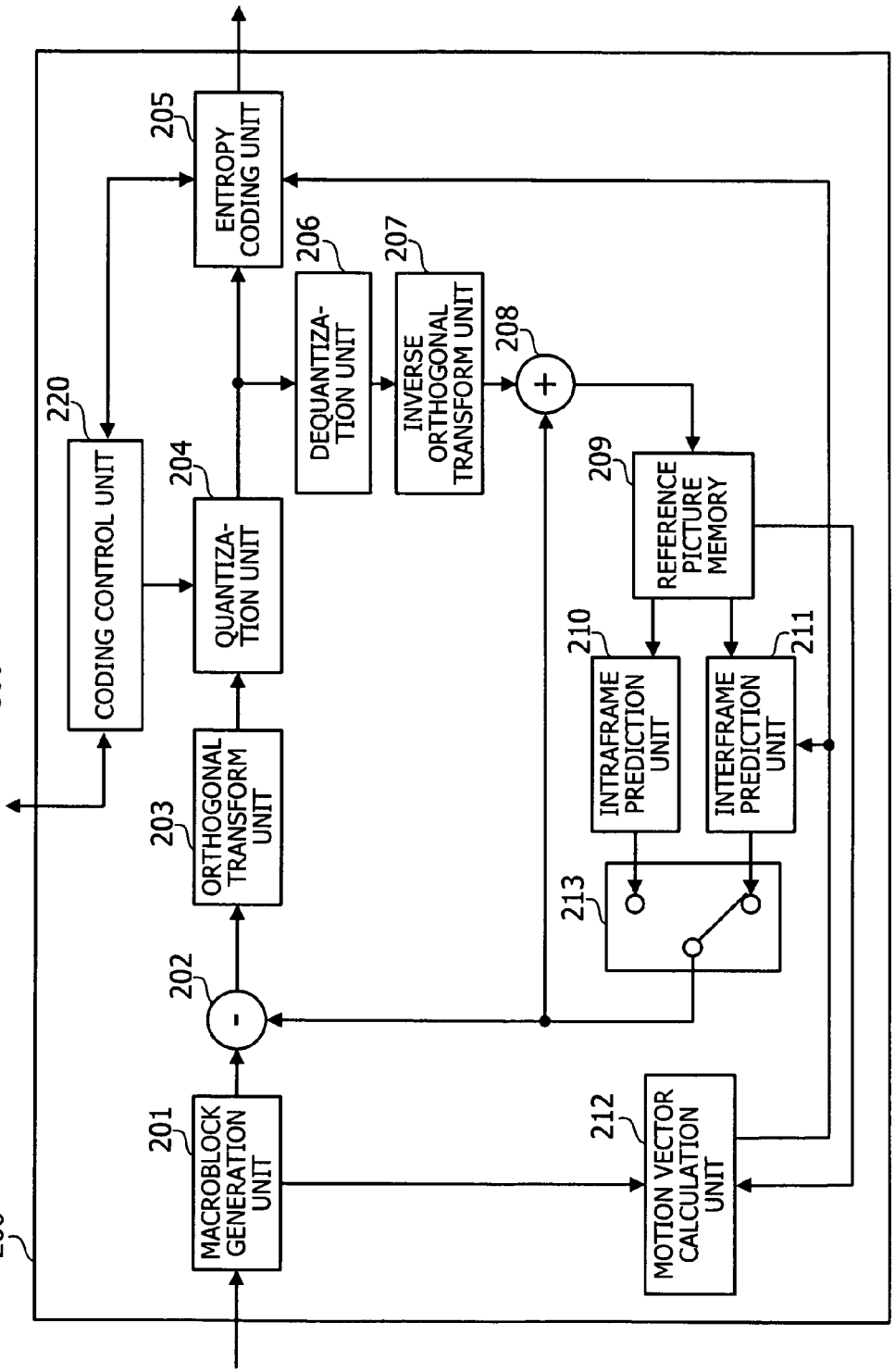
FIG. 3 illustrates an example internal structure of a coding unit.

FIG. 3 illustrates an example internal structure of a coding unit. Since the coding units 200_1, 200_2, 200_3, ... have the same structure, the following explanation of FIG. 3 will refer to them collectively as "coding units 200."

Each coding unit 200 includes a macroblock (MB) generation unit 201, a prediction error signal generation unit 202, an orthogonal transform unit 203, a quantization unit 204, an entropy coding unit 205, a dequantization unit 206, an inverse orthogonal transform unit 207, a reference picture generation unit 208, a reference picture memory 209, an intraframe prediction unit 210, an interframe prediction unit 211, a motion vector calculation unit 212, a predicted picture selection unit 213, and a coding control unit 220.

The macroblock generation unit 201 divides a given source picture into blocks with a size of 16 pixels by 16 pixels, called macroblocks, and supplies them to the prediction error signal generation unit 202 and motion vector calculation unit 212. The following description uses the term "block data" to refer to the picture data of a macroblock(s).

The prediction error signal generation unit 202 produces a prediction error signal by calculating differences between block data supplied from the macroblock generation unit 201 and predicted picture data supplied from the predicted picture selection unit 213. The orthogonal transform unit 203 applies an orthogonal transform on this prediction error signal supplied from the prediction error signal generation unit 202, thus outputting signals representing its frequency components in the horizontal and vertical directions. The quantization unit 204 quantizes those output signals of the orthogonal transform unit 203 to reduce the amount of coded data representing the prediction error signal.

The entropy coding unit 205 subjects the quantized data from the quantization unit 204 to entropy encoding, thus outputting coded video data. Here the entropy encoding is a data coding scheme that assigns variable-length codewords to symbols of data depending on their frequency of occurrence.

The dequantization unit 206 dequantizes quantized data supplied from the quantization unit 204. The inverse orthogonal transform unit 207 then applies an inverse orthogonal transform to this output data of the dequantization unit 206. These operations yield a signal similar to the original prediction error signal before it is coded.

As the prediction error signal has been decoded by the dequantization unit 206 and inverse orthogonal transform unit 207, the reference picture generation unit 208 adds this decoded prediction error signal to each relevant block data which has been motion-compensated by the inter-predicted picture generator 121. The result of this addition is a local decoded picture, i.e., a collection of block data of a motion-compensated reference picture. The data of this local decoded picture is then stored into a reference picture memory 209.

The intraframe prediction unit 210 produces block data of a predicted picture from surrounding pixels that are already coded in the same picture. The interframe prediction unit 211, on the other hand, produces block data of a predicted picture from data of a reference picture read out of the reference picture memory 209. More specifically, the interframe prediction unit 211 produces block data of a motion-compensated version of the predicted picture by motion-compensating the predicted picture with motion vectors supplied from the motion vector calculation unit 212.

The motion vector calculation unit 212 calculates motion vectors on the basis of block data of the current picture supplied from the macroblock generation unit 201 and data of the reference picture read out of the reference picture memory 209.

The predicted picture selection unit 213 selects either the intraframe prediction unit 210 or the interframe prediction unit 211 to output a predicted picture for use by the prediction error signal generation unit 202 and reference picture generation unit 208.

The coding control unit 220 controls the total operation of the coding unit 200 in a centralized manner. For example, the coding control unit 220 has the function of controlling coding rates in the process of compression coding. More specifically, the coding control unit 220 determines a quantization step size used by the quantization unit 204, on the basis of coding results of the entropy coding unit 205. Other functions that the coding control unit 220 performs are to inform the control unit 300 of coding results, and to control each portion of the coding unit 200 according to coding parameters received from the control unit 300. Details of those functions of the coding control unit 220 will be described later.

According to the H.264 specification, each slice header in coded video data contains a piece of data called "frame number" (frame_num). Basically the frame number increases sequentially in the order that the frames are encoded. For example, each coding unit 200_1, 200_2, 200_3, . . . counts up this frame number and adds it to the coded video data.

FIG. 4 illustrates an example of frame numbers added to coded video data.

When a new frame emerges, and when that frame is to be referenced by interframe predictive coded pictures, the frame number is incremented by one at its next frame. In other words, the frame number represents the number of reference frames included in the range of coded video data from its top frame to the frame immediately preceding the current frame. For example, frame "I3" illustrated in FIG. 4 is newly referenced by frame "B1" and frame "B2." Accordingly, the frame number is incremented by one at frame "B1" subsequent to the frame "I3."

The frame number described above is used by H.264 decoders in identifying reference frames. The coder has therefore to add frame numbers correctly. This may not be achieved in the case where the coded video data output is switched among a plurality of coding units 200_1, 200_2, 200_3, . . . , as is done in FIG. 2. That is, the sequence of frame numbers may become discontinuous in such cases. Specifically, the continuity of frame numbers may be disrupted when those coding units 200_1, 200_2, 200_3, . . . are configured to produce P-frames at different intervals M. The discontinuity of frame numbers makes it difficult for a decoder to decode the coded video data properly.

In view of the above, the video coding apparatus 100 according to the present embodiment is designed to add correct frame numbers even when the coded video data outputs are switched as in FIG. 2.

Figure 5:
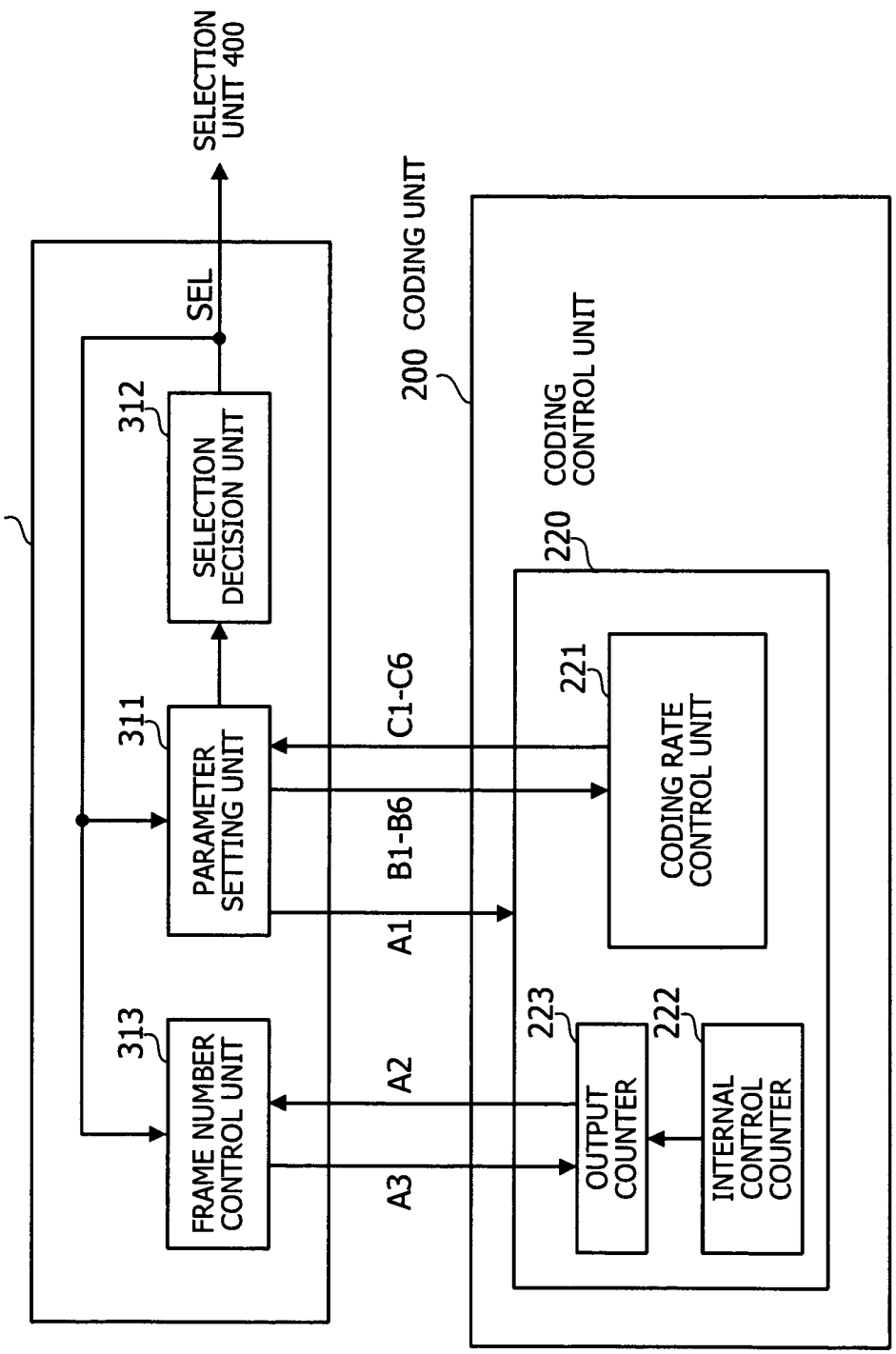
FIG. 5 is a block diagram illustrating functions included in a control unit and a coding control unit.

FIG. 5 is a block diagram illustrating functions included in a control unit and a coding control unit.

As can be seen in FIG. 5, the control unit 300 includes a parameter setting unit 311, a selection decision unit 312, and a frame number control unit 313. On the other hand, the coding control unit 220 in the coding unit 200 includes a coding rate control unit 221, an internal control counter 222, and an output counter 223.

Referring first to the coding control unit 220, the coding rate control unit 221 controls the coding rate of compression coding that the coding unit 200 performs. For example, the coding control unit 220 controls the amount of data stored in a Video Buffer Verifier (VBV) buffer, which is a virtual buffer modeling the decoding end. The target data size of each frame and the quantization step size for quantization processing are calculated in order not to let the VBV buffer overflow or underflow.

The coding rate control unit 221 also receives coding parameters from the parameter setting unit 311 in the control unit 300 as necessary and controls the coding rates according to the received coding parameters. Further the coding rate control unit 221 calculates some coding parameters during the process of compression coding of each single GOP. The coding rate control unit 221 sends the calculated coding parameters to the parameter setting unit 311 each time the coding of a GOP is finished.

The internal control counter 222 counts the frame number for use in the compression coding by the coding unit 200. More specifically, the internal control counter 222 is incremented by one at the start of a frame when the immediately preceding frame is a new frame to be referenced by interframe predictive coded pictures.

The output counter 223 counts the frame number to be added to coded video data that the coding unit 200 produces. This output counter 223 is incremented by one in synchronization with incrementing of the internal control counter 222 by one. The output counter 223 may also be set to a specific count value supplied from the frame number control unit 313 in the control unit 300.

The existing H.264 coders have a counter for the purpose of adding frame numbers to coded video data, rather than for internal control purposes. The internal control counter 222 may correspond to this counter in the existing H.264 coders. The present embodiment uses the output counter 223 for the latter purposes. Some possible coder implementations may use no frame numbers for internal control. Such implementations are allowed to omit the internal control counter 222. In this case, an increment timing signal (not illustrated) is wired not to the internal control counter 222, but to the output counter 223. It is also noted that the function of the output counter 223 may be implemented as part of the control unit 300.

Referring now to the control unit 300, the parameter setting unit 311 exchanges various coding parameters with the coding unit 200. For example, upon completion of compression coding of a GOP, the parameter setting unit 311 receives various coding parameters produced in that compression coding, from the coding rate control unit 221 in one of the coding units 200 that is selected at that point in time to output coded video data. The next GOP is then subjected to the process of compression coding. Based on the received coding parameters, the parameter setting unit 311 determines parameters for controlling the coding rate of I-frame at the top of the new GOP. The determined parameters are then supplied to all coding units 200_1, 200_2, 200_3, . . . as their common parameters.

The selection decision unit 312 calculates a value (called "cost") for the purpose of evaluating coded video data of each GOP, based on some of the coding parameters that the parameter setting unit 311 has received from the coding rate control unit 221. The selection decision unit 312 calculates this cost for each individual coding unit 200_1, 200_2, 200_3, . . . and determines which coding unit has produced coded video data with the lowest cost. The selection decision unit 312 then generates and sends a selection signal SEL to the selection unit 400, thereby specifying the determined coding unit. The same selection signal SEL is also sent to the parameter setting unit 311 and frame number control unit 313.

The frame number control unit 313 controls frame numbers to be added to coded video data that the coding units 200 produce. More specifically, upon completion of compression coding of a GOP, the frame number control unit 313 reads out the current count value from the output counter 223 of one of the coding units 200 that has been selected by the selection decision unit 312. The frame number control unit 313 then passes the count value to the output counter 223 in another or the same coding unit 200 that is selected by the selection decision unit 312 for the next GOP.

FIG. 5 illustrates several coding parameters exchanged between the control unit 300 and coding unit 200. Specifically, those coding parameters are: coding control data A1 to A3, rate control data B1 to B6, and coding statistics data C1 to C6. Their details will be described below.

Coding control data A1 is a parameter that specifies the interval M of P-frames in coded video data to be produced. This coding control data A1 is provided from the parameter setting unit 311 to coding units 200 when those coding units 200 are initialized at the start of a compression coding process, for example. It is assumed in the present embodiment that the coding units 200_1, 200_2, 200_3, . . . may receive different values of coding control data A1. Alternatively, each coding unit 200_1, 200_2, 200_3, . . . may previously be configured to produce P-frames at intervals of M, without using this coding control data A1.

Coding control data A2 indicates a frame number to be added the last frame in the GOP of coded video data that is sent out of the selection unit 400. The count value in an appropriate output counter 223 is sent as coding control data A2 to the frame number control unit 313 in the control unit 300 when the compression coding of a GOP is completed. The source is the output counter 223 in one of the coding units 200 whose coded video data output is selected by the selection decision unit 301 at that point in time.

Coding control data A3 specifies a frame number to be added to I-frame at the top of the next GOP. This coding control data A3 is sent from the frame number control unit 313 in the control unit 300 to all coding units 200_1, 200_2, 200_3, . . . as their common parameter. The coding units 200_1, 200_2, 200_3, . . . configure their respective output counters 223 with the received data.

Rate control data B1 to B6 is a set of parameters that the parameter setting unit 311 in the control unit 300 provides to the coding rate control unit 221 in each coding unit 200 for the purpose of their respective coding rate control operations. Rate control data B1 to B6 is supplied to the plurality of coding units 200_1, 200_2, 200_3, . . . as their common parameters.

Rate control data B1 specifies a bit rate of coded video data that the corresponding coding unit 200 is supposed to produce.

Rate control data B2 specifies a VBV buffer capacity for use in the rate control.

The above two pieces of rate control data B1 and B2 are set from the parameter setting unit 311 to the coding rate control unit 221 when the coding unit 200 is initialized.

Rate control data B3 specifies a VBV buffer position at the start of compression coding of I-frame at the top of GOP.

Rate control data B4 specifies a target data size of I-frame at the top of GOP.

Rate control data B5 specifies an initial quantization step size used at the start of compression coding of I-frame at the top of GOP.

Rate control data B6 specifies an initial position of the quantization buffer at the start of compression coding of I-frame at the top of GOP.

The above four pieces of rate control data B3 to B6 are set from the parameter setting unit 311 to the coding rate control unit 221 each time the compression coding of a new GOP begins.

Coding statistics data C1 to C6 is a set of parameters obtained as a result of coding operations in each coding unit 200. Those six pieces of coding statistics data C1 to C6 are sent from the coding rate control unit 221 to the parameter setting unit 311 when the compression coding of a GOP is completed.

Coding statistics data C1 indicates the VBV buffer position at the end of compression coding of the last frame of the GOP.

Coding statistics data C2 indicates the amount of produced data for each frame in the GOP.

Coding statistics data C3 indicates the average value of quantization step sizes assigned to macroblocks in each frame.

Coding statistics data C4 indicates the coding distortion of each frame in the GOP.

Coding statistics data C5 indicates the quantization buffer position at the end of compression coding of I-frame at the top of the GOP.

Coding statistics data C6 indicates the target data size of I-frame at the top of the next GOP.

Figure 6:
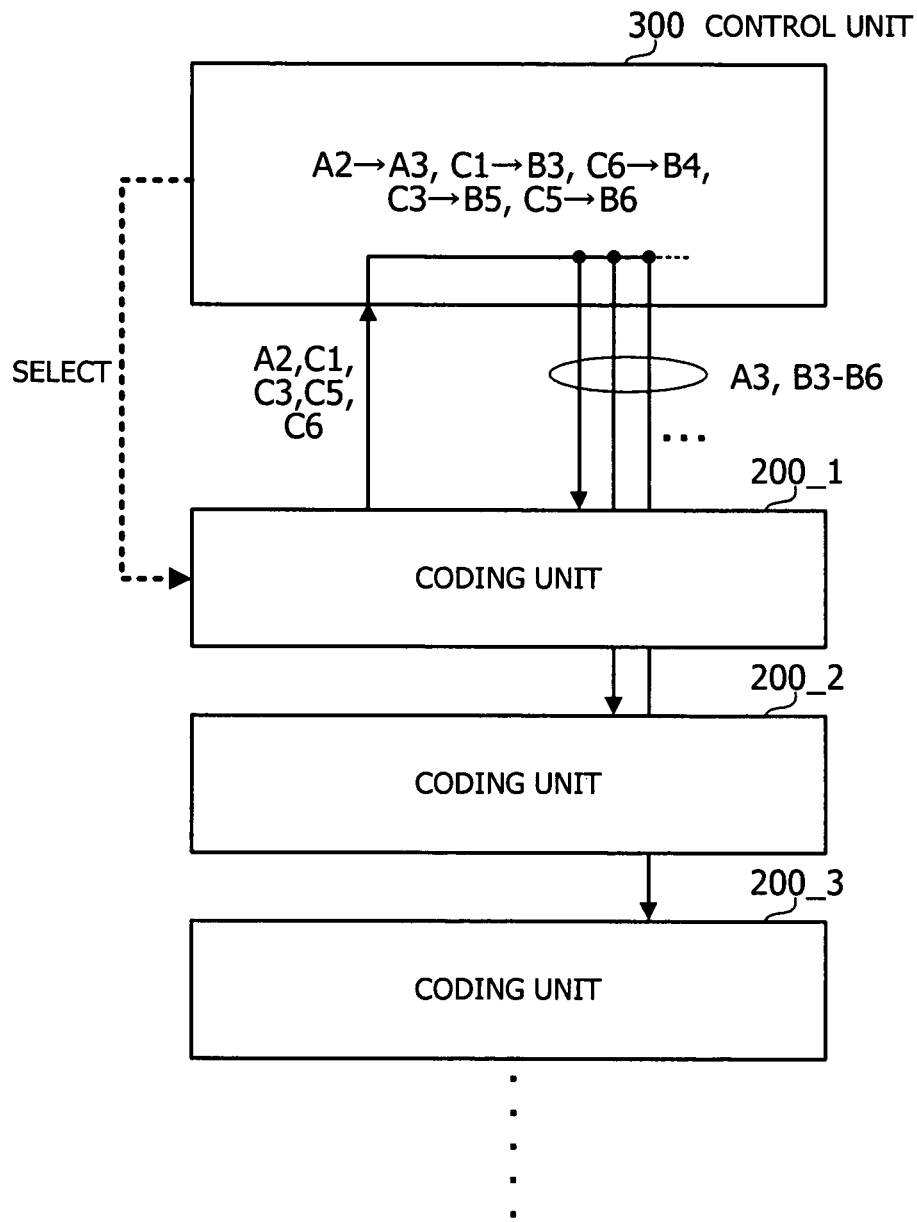
FIG. 6 explains how coding parameters are exchanged at the end of compression coding of GOP.

FIG. 6 explains how coding parameters are exchanged at the end of compression coding of GOP.

As stated above, each coding unit 200_1, 200_2, 200_3, . . . sends coding control data A2 and coding statistics data C1, C3, C5, and C6 to the control unit 300 when the compression coding of a GOP is finished. The control unit 300 receives coding control data A2 and coding statistics data C1, C3, C5, and C6 from one of the coding units that has been selected for that GOP by the selection decision unit 312. It is supposed in the example of FIG. 6 that the coding unit 200_1 has been selected.

Alternatively, the coding units may be configured such that coding control data A2 and coding statistics data C1, C3, C5, and C6 are sent to the control unit 300 only from the coding unit that has been selected by the selection decision unit 312. Regarding the other pieces of coding statistics data C2 and C4, the control unit 300 collects them from every coding unit 200_1, 200_2, 200_3, . . . and calculates costs form the collected data as will be described later.

The frame number control unit 313 in the control unit 300 distributes the coding control data A2 received from the coding unit selected by the selection decision unit 312, to all coding units 200_1, 200_2, 200_3, . . . as coding control data A3. Further the parameter setting unit 311 in the control unit 300 distributes the coding statistics data C1, C6, C3, and C5 received from the selected coding unit, to all coding units 200_1, 200_2, 200_3, . . . as rate control data B3, B4, B5, and B6, respectively.

Every coding unit 200_1, 200_2, 200_3, . . . configures its output counter 223 with a count value specified by the coding control data A3 supplied from the control unit 300. This operation ensures the continuity of frame numbers added to coded video data, no matter which coding unit 200_1, 200_2, 200_3, . . . may be selected to output coded video data of the next GOP.

Every coding unit 200_1, 200_2, 200_3, . . . also configures its coding rate control unit 221 with rate control data B3 to B6 supplied from the control unit 300. This enables all the coding units 200_1, 200_2, 200_3, . . . to encode I-frame at the top of the next GOP by using the same set of coding parameters. That is, all the coding units 200_1, 200_2, 200_3, . . . output coded video data by using identical local decoded pictures based on the topmost I-frame of the GOP.

Figure 7:
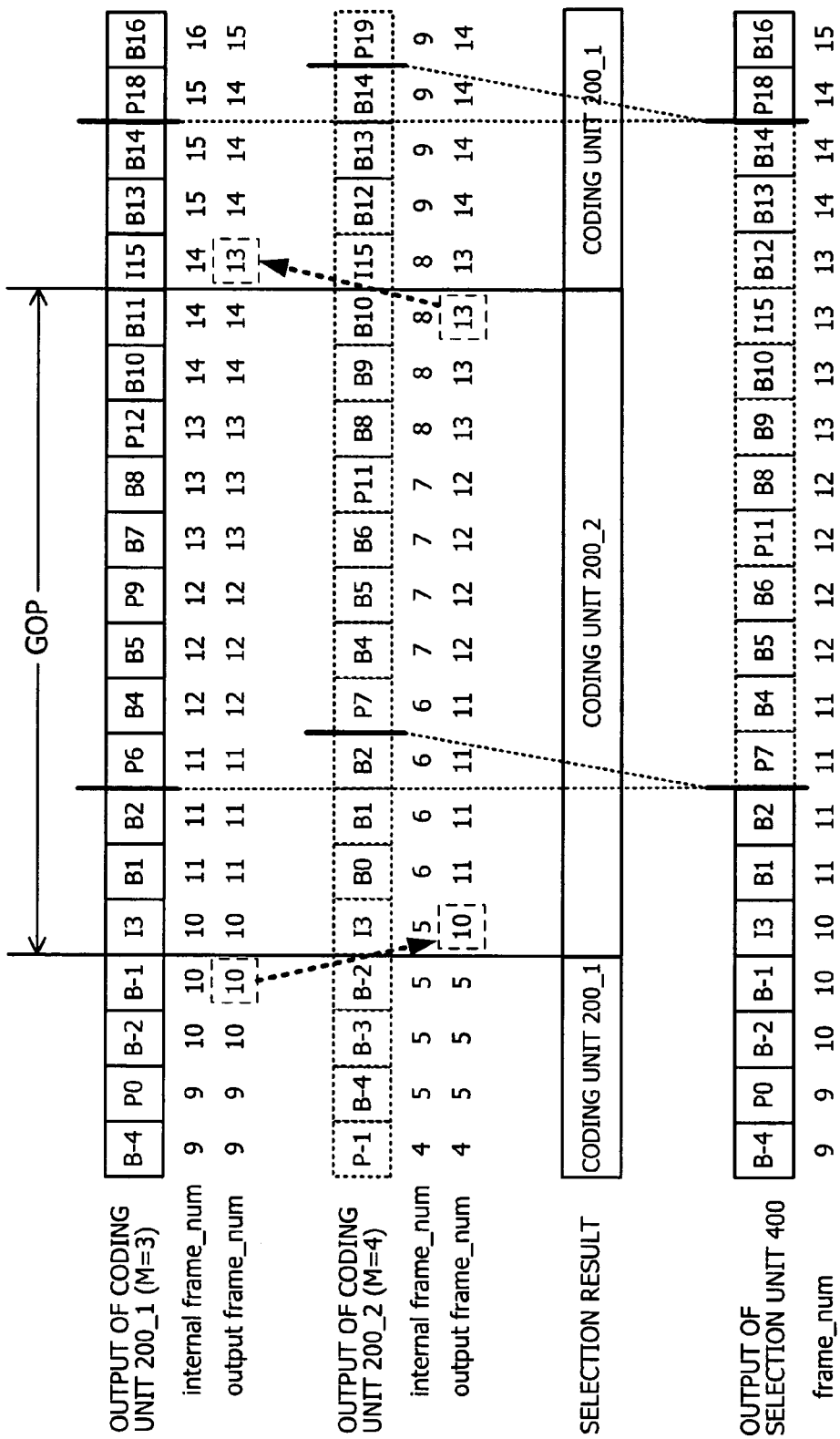
FIG. 7 illustrates selection of coded video data outputs.

FIG. 7 illustrates selection of coded video data outputs. It is assumed in FIG. 7 that the output data of two coding units 200_1 and 200_2 is subjected to the output switching operation by the selection unit 400 similarly to the foregoing example of FIG. 2. Also similarly to FIG. 2, those coding units 200_1 and 200_2 are configured to produce P-frames at intervals M of 3 and 4, respectively.

The selection of outputs in FIG. 7 proceeds basically in the same way as in FIG. 2. That is, the selection decision unit 312 determines to switch from one coding unit 200_1 to the other coding unit 200_2 immediately before a GOP that begins with frame "I3." The selection unit 400 thus switches coded video data outputs at the point immediately before the first P-frame in that GOP. In the example of FIG. 7, the selection unit 400 continues to output coded video data supplied from the coding unit 200_1 up to the frame immediately before frame "P6," which is the first P-frame appearing in the GOP. The selection unit 400 then outputs coded video data from the coding unit 200_2, beginning with frame "P7," the first P-frame appearing in the GOP.

As discussed in FIG. 6, the two coding units 200_1 and 200_2 execute compression coding in such a way that they will produce identical local decoded pictures based on the topmost I-frame of a GOP. For this reason, the first P-frame in the GOP makes reference to the same picture, regardless of whether the selection unit 400 actually changes coded video data outputs in that GOP. The coded video data coming out of the selection unit 400 is expected to be decoded correctly even in the case where an open GOP structure is used in the compression coding.

FIG. 7 also depicts frame numbers assigned to the frames. The frame numbers include those derived from count values of the internal control counter 222 and those derived from count values of the output counter 223. The former frame numbers are referred to herein as "internal frame numbers," and the latter as "output frame numbers."

At the time point immediately before the start of compression coding of a GOP beginning with frame "I3" in FIG. 7, the coding unit 200_1 selected by the selection decision unit 312 provides an output frame number to the control unit 300. This output frame number is what has been added to the last frame of the preceding GOP. In the example of FIG. 7, the output frame number reads "10" and is given to the output counter 223 in the coding unit 200_2 as its count value.

The output counter 223 in the coding unit 200_2 sets the given output frame number as its initial value. This output counter 223 is now ready to increment itself in synchronization with the internal control counter 222. The count values of the output counter 223 are used as frame numbers for the coded video data that the selection unit 400 outputs. The coded video data thus obtains a continuous series of frame numbers, which permits the decoder to decode the coded video data properly.

The following section will describe coding statistics data, basically assuming the use of a coding rate control method according to the MPEG-2 TM5.

The coding rate control unit 221 in a coding unit 200 may provide several functions for controlling coding rates. One such function is to determine the target data size on an individual frame basis. Another such function is to determine the quantization step size on an individual macroblock basis. The coding rate control unit 221 determines a target data size, quantization step size, and the like so as not to let the VBV buffer overflow or underflow when the compression coding is executed.

During the course of compression coding, the coding rate control unit 221 calculates a target data size for the next frame to be coded. This calculation is performed for each different picture type. Specifically, the target data sizes of I-frame, P-frame, and B-frame are calculated according to equations (1), (2), and (3), $$T_i = \max\left\{\frac{R}{\left(1 + \frac{N_p X_p}{X_i K_p} + \frac{N_b X_b}{X_i K_b}\right)} \cdot \frac{\text{bit\_rate}}{8 \times \text{picture\_rate}}\right\} \quad (1)$$

$$T_p = \max\left\{\frac{R}{\left(N_p + \frac{N_b K_p X_b}{K_b X_p}\right)} \cdot \frac{\text{bit\_rate}}{8 \times \text{picture\_rate}}\right\} \quad (2)$$

$$T_b = \max\left\{\frac{R}{\left(N_b + \frac{N_p K_b X_p}{K_p X_b}\right)} \cdot \frac{\text{bit\_rate}}{8 \times \text{picture\_rate}}\right\} \quad (3)$$

respectively.

In the above equations (1) to (3), variable bit_rate represents the bit rate of coded video data in units of bits per second. This bit rate value is given as rate control data B1 from the control unit 300 at the start of compression coding. Variable picture_rate represents the frame rate in units of frames per second. Variable R represents the amount of data assigned to the entire GOP. R is subjected to a subtraction of the actual amount of produced data of a frame after the compression coding of that frame is finished.

Variable $N_p$ represents the number of P-frames in GOP. Variable $N_b$ represents the number of B-frames in GOP. Variables $X_i$, $X_p$, and $X_b$ represent coding complexities of I-frames, P-frames, and B-frames, respectively. The coding complexity is obtained as a product of the amount of coded data and quantization step size. Variables $K_p$ and $K_b$ represent weighting coefficients for P-frames and B-frames, respectively. Actually, predetermined fixed values are assigned to $K_p$ and $K_b$.

Upon completion of compression coding of a GOP, the coding rate control unit 221 sends coding statistics data C6 to the parameter setting unit 311 in the control unit 300 to indicate the target data size for the next I-frame. Further the coding rate control unit 221 sends coding statistics data C1 to the parameter setting unit 311 to indicate the VBV buffer position at the end of compression coding of the last frame of the GOP.

As described in FIG. 6, the parameter setting unit 311 collects coding statistics data C1 and C6 from one of the coding units 200 that has been selected by the selection decision unit 312 for the GOP currently being processed. The parameter setting unit 311 then distributes the collected coding statistics data C1 and C6 to all coding units 200_1, 200_2, 200_3, . . . as rate control data B3 and B4, respectively. This enables every coding unit 200_1, 200_2, 200_3, . . . to share the same target data size for the I-frame at the top of the next GOP. For P-frames and B-frames, the coding units 200_1, 200_2, 200_3, . . . may set their individual target data sizes.

The coding rate control unit 221 calculates a $$Q = \left(\frac{62 \times \text{picture\_rate} \times d_X}{\text{bit\_rate}}\right) \quad (4)$$

quantization step size Q for each macroblock according to the following equation (4).

In the above equation (4), variable $d_x$ indicates a quantization buffer position, where the suffix X represents "i" or "p" or "b." That is, variables $d_i$, $d_p$, and $d_b$ indicate the quantization buffer positions regarding I-frame, P-frame, and B-frame, respectively. Those variables $d_x$ are calculated and updated for each macroblock according to the following equation (5).

$$d_X = d'_X + B_{j-1} - \left(\frac{T_X \times (j-1)}{\text{MB\_cnt}}\right) \quad (5)$$

In the above equation (5), variable $d'_x$ indicates the initial quantization buffer position at the start of processing the topmost macroblock of a given frame. Variable j is a number for identifying the macroblock being processed. Variable $B_{j-1}$ represents the total amount of data produced up to the (j-1)th macroblock in the frame. Variable MB_cnt indicates the total number of macroblocks constituting the frame.

Upon completion of compression coding of a GOP, the coding rate control unit 221 calculates the average quantization step size of macroblocks of the immediately preceding I-frame on the basis of quantization step size Q used in the quantization of that frame. The coding rate control unit 221 then sends coding statistics data C3 to the parameter setting unit 311 in the control unit 300 to provide the calculated value. Further the coding rate control unit 221 sends coding statistics data C5 to the parameter setting unit 311 to indicate the quantization buffer position at the end of compression coding of the I-frame. This coding statistics data C5 is calculated as variable $d_i$ in equation (5) when j=MB_cnt.

As described above in FIG. 6, the parameter setting unit 311 collects coding statistics data C3 and C5 from one of the coding units 200 that has been selected by the selection decision unit 312 for the GOP currently being processed. The parameter setting unit 311 then distributes the collected coding statistics data C3 and C5 to all coding units 200_1, 200_2, 200_3, as rate control data B5 and B6, respectively. Every coding unit 200_1, 200_2, 200_3, . . . uses these pieces of rate control data B5 and B6 as their common parameters for use in the next I-frame. More specifically, when quantizing the topmost macroblock of the next I-frame, the coding units 200 use the coding statistics data C3 and C5 as quantization step size Q and variable d' in equation (5).

The above processing causes the coding units 200_1, 200_2, 200_3, . . . to perform compression coding of the topmost I-frame of the next GOP with the same target data size and the same quantization step size for the topmost macroblock. The above processing also unifies the initial positions of their VBV buffers and quantization buffers to be used in compression coding of the next GOP. In the subsequent operation of each coding unit 200_1, 200_2, 200_3, . . . , the coding rate is controlled not to let the VBV buffer overflow or underflow. It is therefore possible for the decoder to decode the coded video data properly, no matter which outputs of the coding units 200_1, 200_2, 200_3, . . . have been selected.

The entire processing in the coding unit 200 and control unit 300 will now be described below with reference to a few flowcharts.

Figure 8:
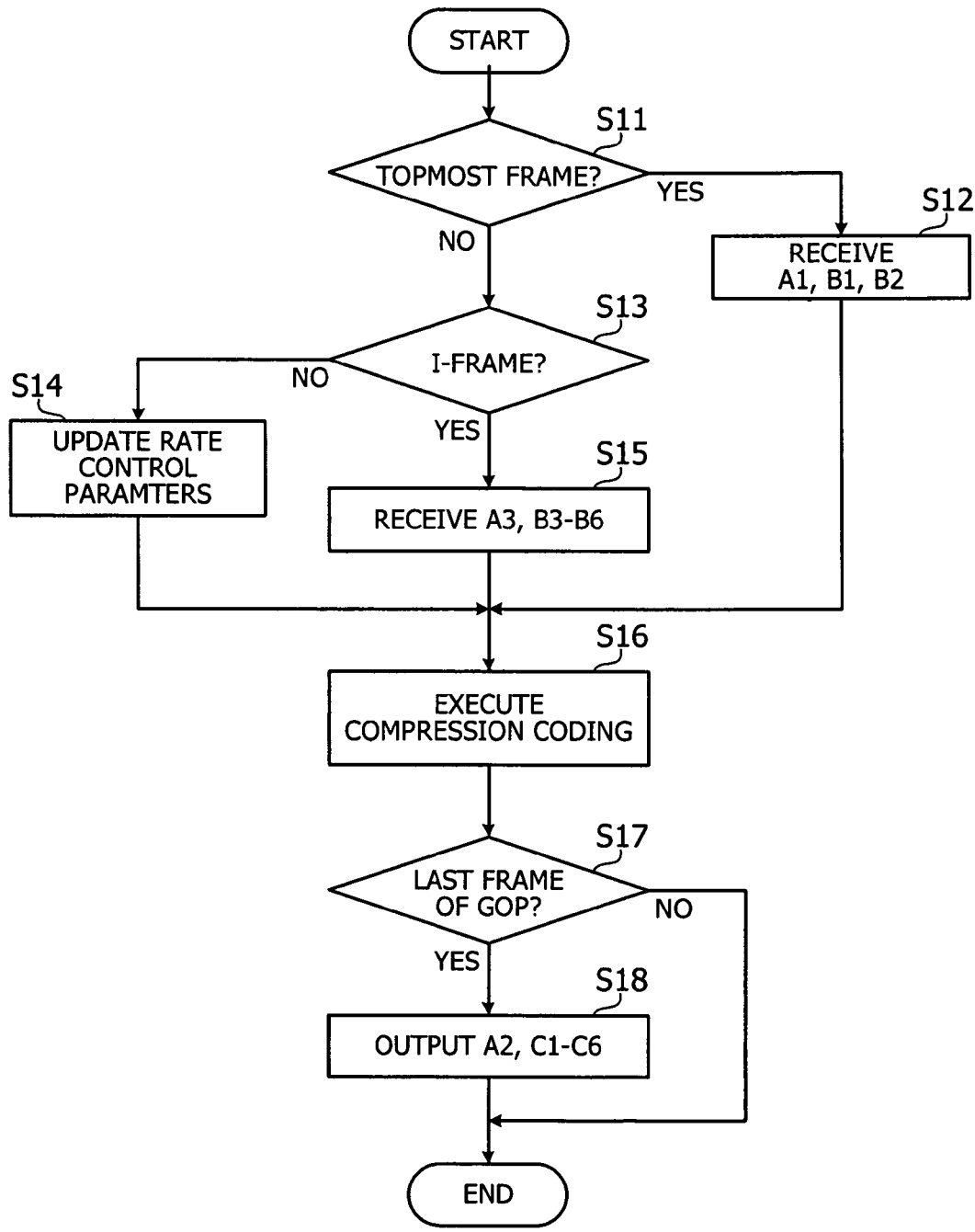
FIG. 8 is a flowchart illustrating a process executed by each coding unit.

FIG. 8 is a flowchart illustrating a process executed by each coding unit. Specifically, the process illustrated in FIG. 8 is executed in compression coding of each frame.

(Step S11) The process proceeds to step S12 when the currently selected frame is the topmost frame in the currently coded video data. Otherwise, the process advances to step S13.

(Step S12) The coding control unit 220 receives coding control data A1 from the parameter setting unit 311 in the control unit 300 and uses it to set the interval M of P-frames in the coded video data. It is assumed in the present embodiment that the coding units 200_1, 200_2, 200_3, . . . are given different intervals M.

Alternatively, each coding unit 200_1, 200_2, 200_3, ... may previously be configured with a different interval M. Other different parameters for the coding units 200_1, 200_2, 200_3, ... include the types of frame structure and filed structure, the ways of direct mode motion compensation (e.g., temporal direct mode, spatial direct mode), and the like.

The coding rate control unit 221 also receives rate control data B1 and B2 from the parameter setting unit 311 in the control unit 300 and uses the data to set initial values of coding rate control parameters. The two pieces of rate control data B1 and B2 are applied to all coding units 200_1, 200_2, 200_3, ... equally. The target data size for the topmost I-frame may be given, for example, an initial value that is determined in accordance with the bitrate.

After the above processing is executed, the process advances to step S16.

(Step S13) When the currently selected frame is I-frame at the top of GOP, the process advances to step S15. Otherwise, the process advances to step S14.

(Step S14) The coding rate control unit 221 updates coding rate control parameters. For example, the coding rate control unit 221 calculates a target data size for the frame to be coded. When the currently selected frame is a P-frame or B-frame, the target data size is calculated from the corresponding equation (2) or (3) discussed above. The GOP may include two or more I-frames, and the frame processed at this step may be one of such extra I-frames. When this is the case, the target data size is calculated from equation (1). The process then advances to step S16.

(Step S15) The output counter 223 receives coding control data A3 from the frame number control unit 313 in the control unit 300 and uses the data to set its initial count value. The coding rate control unit 221 receives rate control data B3 to B6 from the parameter setting unit 311 in the control unit 300 and uses the data as coding rate control parameters.

More specifically, the coding rate control unit 221 uses rate control data B3 to set its VBV buffer position at the start of compression coding of the currently selected frame (I-frame). The coding rate control unit 221 also uses rate control data B4 as the target data size for this frame. The coding rate control unit 221 further uses rate control data B5 and B6 to calculate the quantization step size of macroblocks. The coding rate control unit 221 also uses rate control data B6 to set its quantization buffer position at the start of quantization of the current frame.

Further, the coding rate control unit 221 calculates and sets a target data size for the current GOP, including the current frame, according to the following equation (6).

$$R = \left(\frac{\text{bit\_rate} \times N}{\text{picture\_rate}}\right) + V_{current} - V_{full} \quad (6)$$

In the above equation (6), variable N represents the total number of frames constituting a GOP. Variable $V_{current}$ represents the VBV buffer position at the start of compression coding of I-frame, which is derived from rate control data B3. Variable $V_{full}$ represents the size of the VBV buffer, which is derived from the rate control data B2 received at step S12.

The process then advances to step S16.

(Step S16) The coding unit 200 executes compression coding of the currently selected frame. During this course, the coding rate control unit 221 controls the coding rate by using rate control data provided at one of the steps S12, S14, and S15.

(Step S17) When the currently selected frame is the last frame of GOP, the process advances to step S18. Otherwise, the process exits from the processing of this frame.

(Step S18) The output counter 223 outputs its present count value to the frame number control unit 313 in the control unit 300. The coding rate control unit 221, on the other hand, outputs coding statistics data C1 to C6 to the parameter setting unit 311 in the control unit 300. Coding statistics data C4 indicates coding distortions of each frame in a GOP, which is calculated as the sum of absolute differences between source picture data and local decoded picture data.

Figure 9:
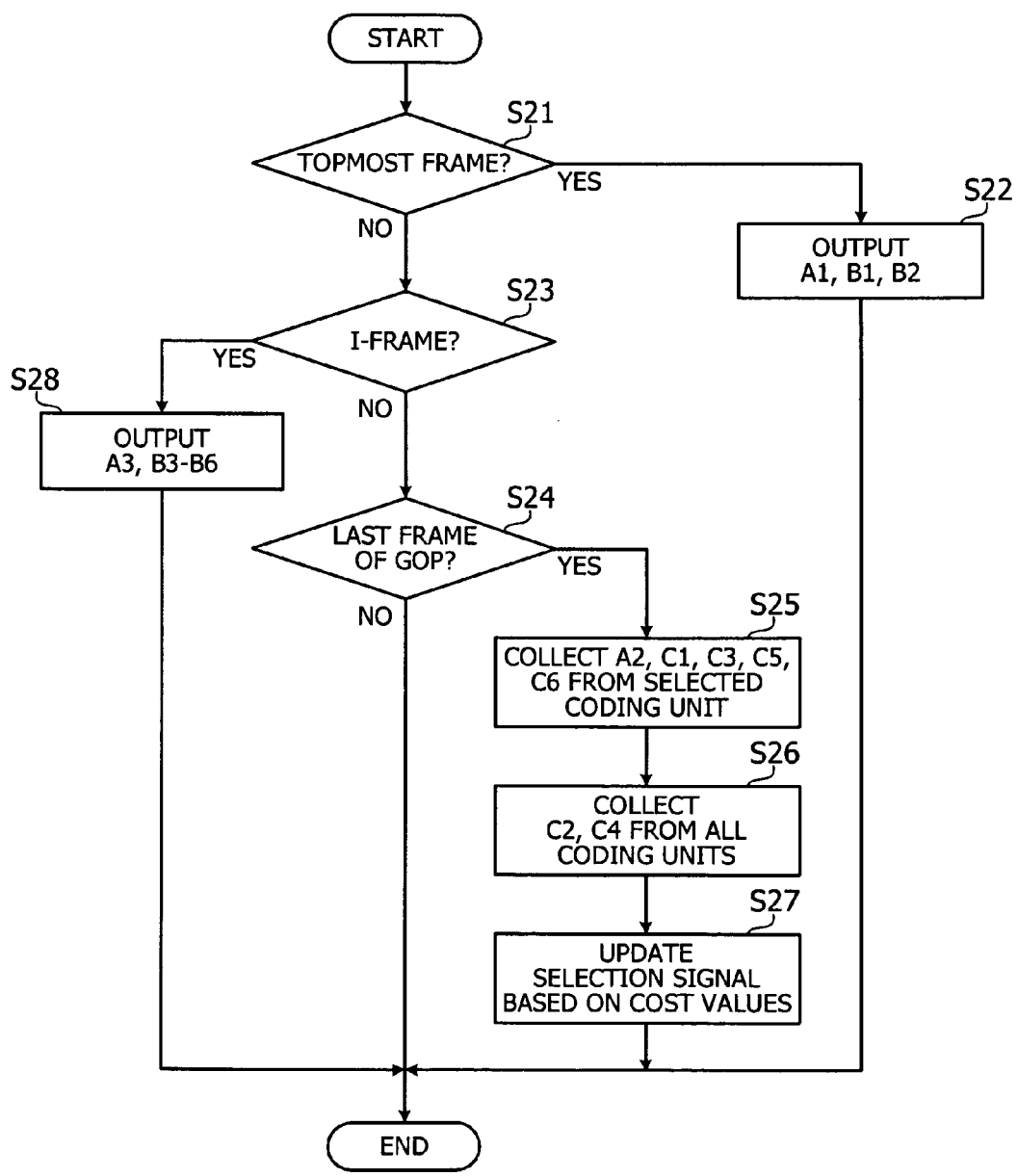
FIG. 9 is a flowchart illustrating a process executed by a control unit.

FIG. 9 is a flowchart illustrating a process executed by the control unit. Specifically, the process illustrated in FIG. 9 is executed in compression coding of each frame.

(Step S21) The process proceeds to step S22 when the currently selected frame is the topmost frame in the currently coded video data. Otherwise, the process advances to step S23.

(Step S22) The parameter setting unit 311 provides the individual coding units 200_1, 200_2, 200_3, ... with different coding control data A1. Also the parameter setting unit 311 sends rate control data B1 and B2 to the coding rate control unit 221 of every coding unit 200_1, 200_2, 200_3, ... as their common parameters. Upon completion, the process exits from the processing of this frame.

(Step S23) When the currently selected frame is the I-frame at the top of GOP, the process advances to step S28. Otherwise, the process advances to step S24.

(Step S24) When the currently selected frame is the last frame of GOP, the process advances to step S25. Otherwise, the process exits from the processing of this frame.

(Step S25) Based on selection signal SEL from the selection decision unit 312, the parameter setting unit 311 and frame number control unit 313 identify which coding unit is currently selected. The parameter setting unit 311 receives coding statistics data C1, C3, C5, and C6 from the identified coding unit, which has been provided by the processing at step S18 of FIG. 8. The frame number control unit 313, on the other hand, collects coding control data A2 from the identified coding unit, which has been provided by the processing at step S18.

(Step S26) The parameter setting unit 311 collects coding statistics data C2 and C4 from every coding unit 200_1, 200_2, 200_3, ..., which has been provided by the processing at step S18.

(Step S27) The selection decision unit 312 calculates costs on the basis of the coding statistics data C2 and C4 collected at step S26 by the parameter setting unit 311. The selection decision unit 312 then identifies which coding unit has produced coded video data with the minimum cost. The selection decision unit 312 updates the selection signal SEL so as to select the identified coding unit and sends the new selection signal SEL to the selection unit 400, parameter setting unit 311, and frame number control unit 313.

The cost is calculated according to the following equation (7).

$$\text{Cost} = \sum_{k=0}^{N-1} (ds_k + \lambda R_k) \quad (7)$$

In the above equation (7), variable N represents the total number of frames constituting a GOP. Variable $ds_k$ represents coding distortion of the k-th frame in GOP, which is derived from coding statistics data C4. Variable $\lambda$ indicates a weight of the amount of produced data. Variable $R_k$ represents the amount of data produced from the k-th frame in GOP, which is derived from coding statistics data C2.

Upon completion, the process exits from the processing of this frame.

(Step S28) The frame number control unit 313 outputs coding control data A3 to all coding units 200_1, 200_2, 200_3, . . . , which is derived from the coding control data A2 collected at the last-executed step S25. The parameter setting unit 311, on the other hand, outputs rate control data B3, B4, B5, and B6 to all coding units 200_1, 200_2, 200_3, . . . , which is derived from the coding statistics data C1, C6, C3, and C5 collected at the last-executed step S25. Upon completion, the process exits from the processing of this frame.

As a result of the processing discussed above in FIGS. 8 and 9, all the coding units 200_1, 200_2, 200_3, . . . output their respective coded video data by using identical local decoded pictures based on the topmost I-frame of a GOP. It is therefore possible for the decoder to decode the coded video data properly, no matter whether the selection unit 400 switches the coding units 200_1, 200_2, 200_3, . . . to produce the data. This means that the rate of coded video data is controlled properly, so that the decoder decodes it without experiencing overflow or underflow of the input buffer. Also, the frame numbers included in this coded video data ensure correct decoding of the video.

The above-described processing techniques enable the combined use of an open GOP structure and multiple-coder system. Open GOP structure is advantageous in terms of coding efficiency. The multiple-coder system selects the lowest-cost, highest-quality output of coded video data from among those produced by a plurality of coding units. The proposed techniques thus makes it possible to produce coded video data with a high coding efficiency and a high picture quality.

Figure 10:
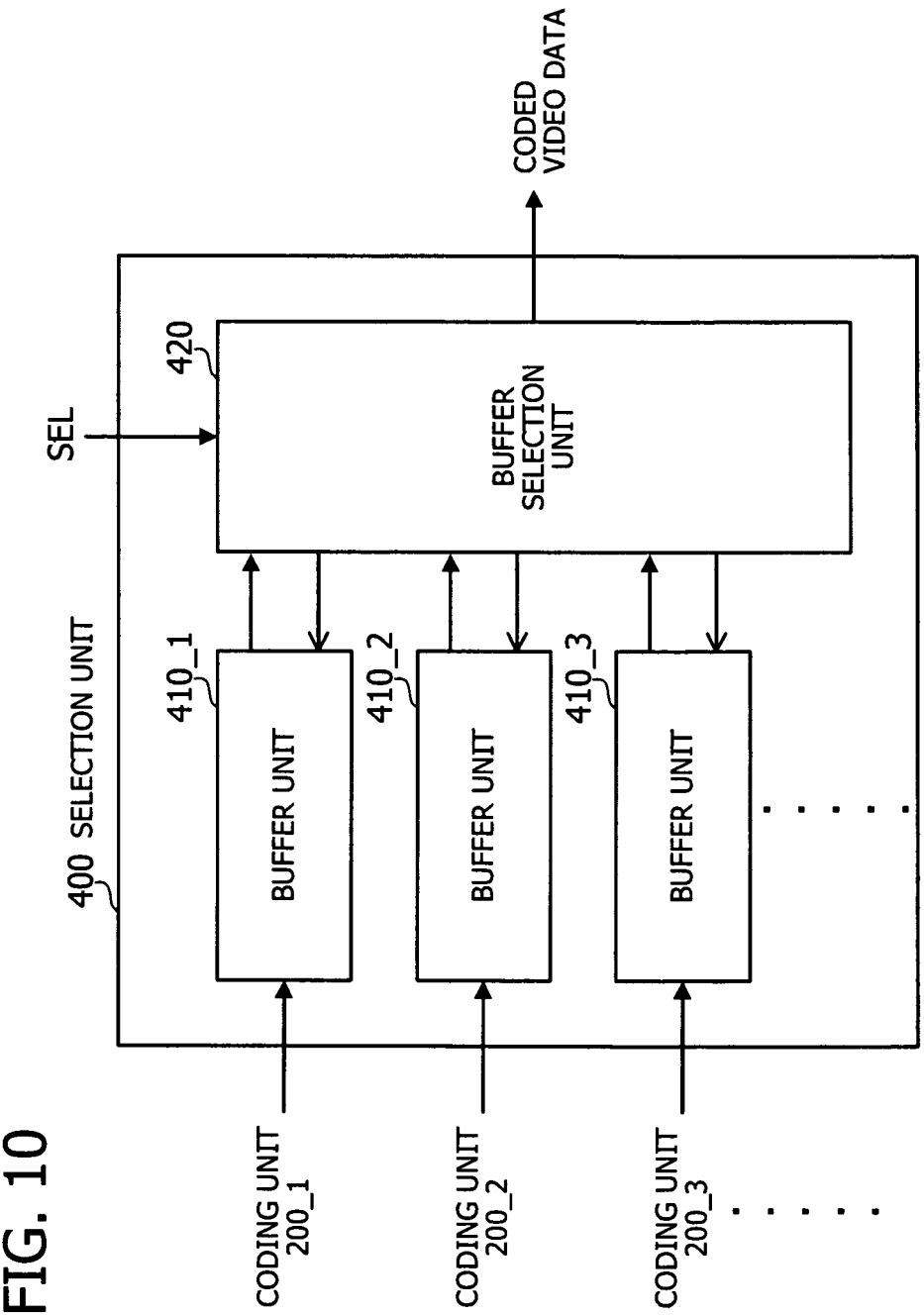
FIG. 10 illustrates an example internal structure of a selection unit.

An example of output switching operations by the selection unit 400 will now be described below. FIG. 10 illustrates an example internal structure of the selection unit.

The illustrated selection unit 400 includes a plurality of buffer units 410_1, 410_2, 410_3, . . . and a buffer selection unit 420. The buffer units 410_1, 410_2, 410_3, . . . provide the function of temporarily storing coded video data produced by the coding unit 200_1, 200_2, 200_3, . . . , respectively. The buffer selection unit 420 receives a selection signal SEL from the control unit 300, which specifies one of those coding units. The buffer selection unit 420 sends an output command signal to one of the buffer units that corresponds to the specified coding unit, thereby requesting that buffer unit to output its coded video data.

Figure 11:
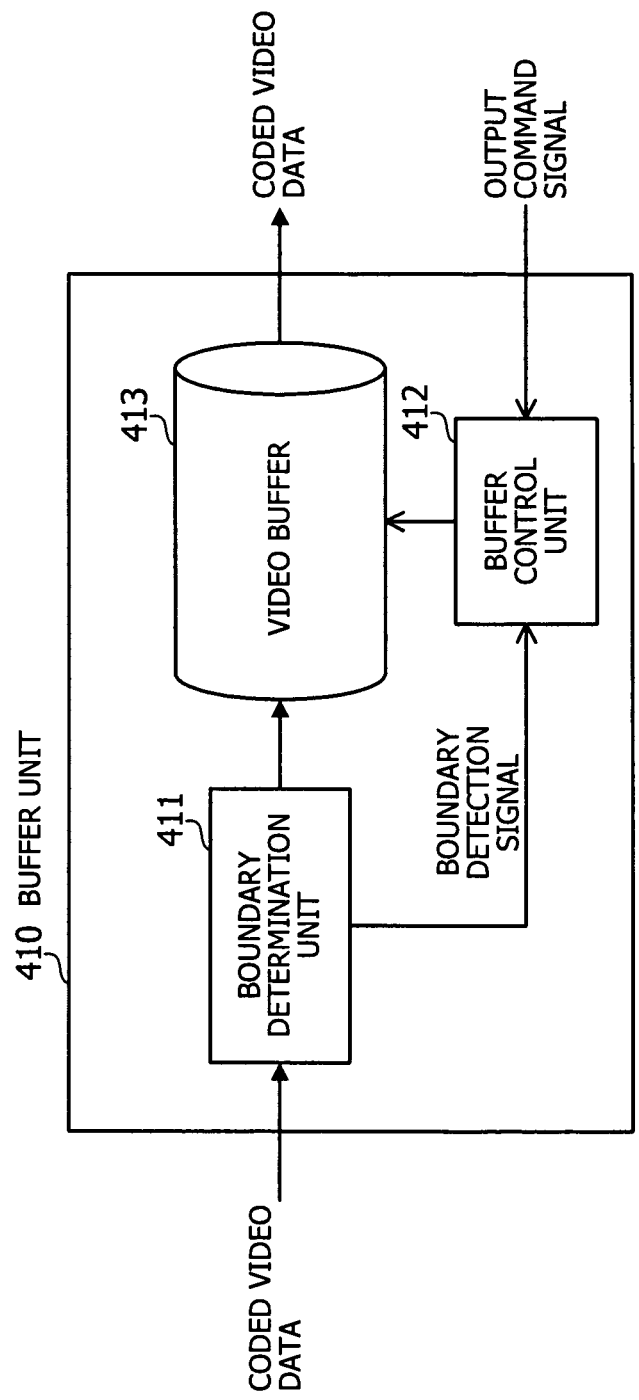
FIG. 11 illustrates an example internal structure of a buffer unit.

FIG. 11 illustrates an example internal structure of a buffer unit. Since all buffer units 410_1, 410_2, 410_3, . . . have the same structure, FIG. 11 illustrates them collectively as a "buffer unit 410."

The buffer unit 410 includes a boundary determination unit 411, a buffer control unit 412, and a video buffer 413.

The boundary determination unit 411 receives coded video data from a corresponding coding unit 200 and determines the boundaries separating picture groups, with which the coded video data output is switched. Here the term "picture group" refers to a series of successive pictures that begins with the first P-frame in a GOP and ends with a frame immediately before the first P-frame in the next GOP. Referring back to, for example, the coded video data output of the coding unit 200_1 in FIG. 7, the portion from frame "P6" to frame "B14" constitutes a picture group.

When a P-frame is entered for the first time in a GOP, the boundary determination unit 411 detects it as a boundary of picture groups and thus outputs a boundary detection signal to the buffer control unit 412. The coded video data entered to the boundary determination unit 411 is temporarily stored in the video buffer 413.

In the case of, for example, an MPEG-2 stream, the top end of a GOP is determined from its GOP header. In the case of an H.264 stream, the top end of a GOP is determined from its Sequence Parameter Set (SPS). P-frames are identified by the frame type field in picture header. Otherwise, the coding units 200_1, 200_2, 200_3, . . . may be configured to add some special information to their respective coded video data outputs to mark the above-noted boundaries separating picture groups. This method makes it easier for the boundary determination unit 411 to find picture group boundaries by using the special information included in the received coded video data. In this case, the special information may be removed from the coded video data before it is sent out of the buffer unit 410.

Based on the input timing of boundary detection signals from the boundary determination unit 411, the buffer control unit 412 recognizes the top address and end address of each picture group in the video buffer 413. The buffer control unit 412 then instructs the buffer control unit 412 to either output or delete the stored coded video data, depending on an output command signal from the buffer selection unit 420. This instruction is issued on an individual picture group basis.

Figure 12:
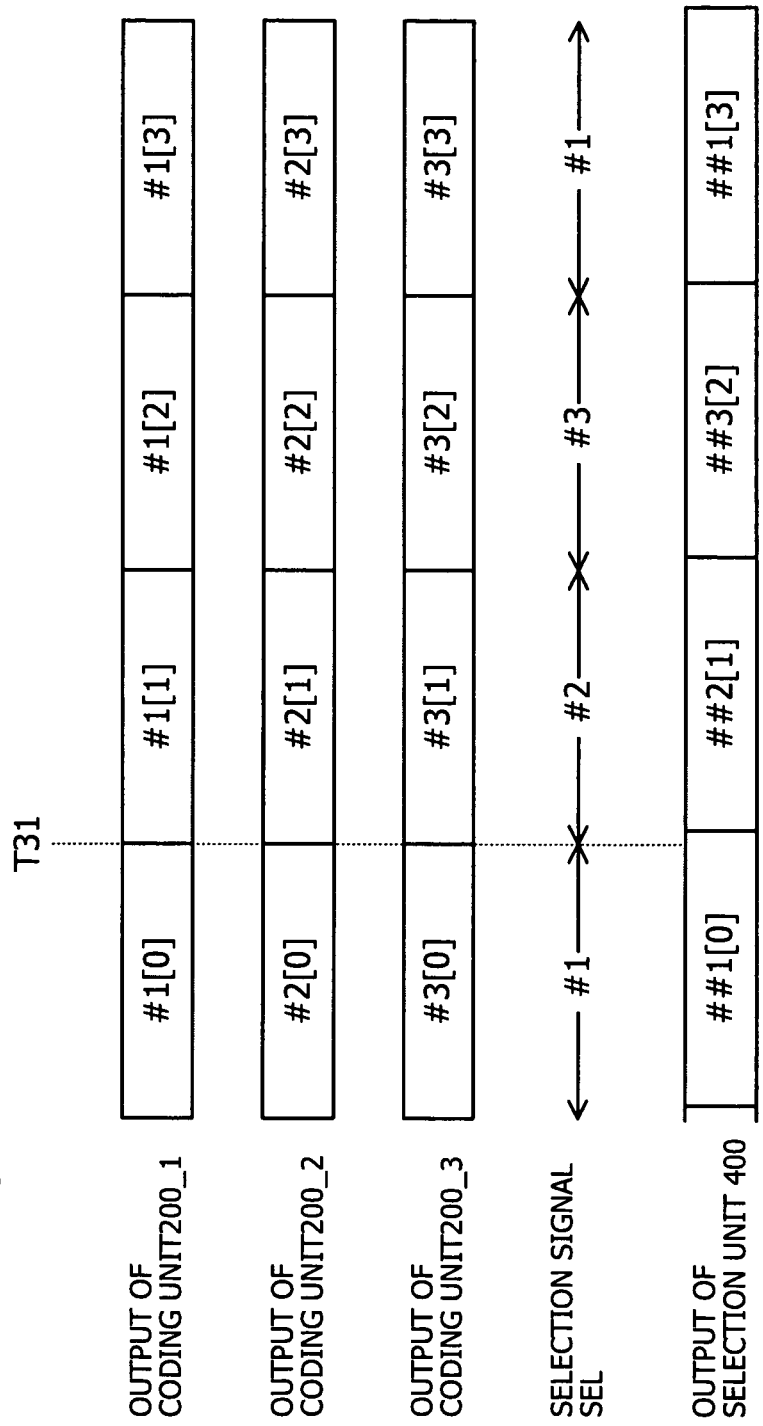
FIG. 12 illustrates a first example of output switching operations executed by a selection unit.

FIG. 12 illustrates a first example of output switching operations executed by the selection unit.

In FIG. 12, symbol "#n[m]" represents the m-th GOP produced by the n-th coding unit 200_n. Symbol "#n" indicates that the selection signal SEL specifies the output of the n-th coding unit 200_n. Symbol "##n[m]" represents a switched picture group that corresponds to GOP #n[m]. That is, the picture group ##n [m] begins at the first P-frame in a GOP #n[m] and ends at the frame immediately before the next GOP #n[m+1]. The above notation is also applied to FIG. 13 described later.

As can be seen from FIG. 12, the selection signal SEL is updated at time T31, based on the costs calculated from each of GOP #1[0], GOP #2[0], and GOP #3[0]. As a result, the selection signal SEL now specifies the output of the coding unit 200_2. Here the selection unit 400 is already receiving the next GOP. The updated selection signal SEL causes the selection unit 400 to select picture group ##2[1], which corresponds the next GOP #2[1] produced by the coding unit 200_2.

Each buffer unit 410_1, 410_2, 410_3, . . . in the selection unit 400 has a video buffer 413. The above-described processing allows the capacity of this video buffer 413 to be less than the GOP data size, thus contributing to reduction of the buffer circuit size and manufacturing cost. The delay of coded video data from the selection unit 400 is also reduced.

Figure 13:
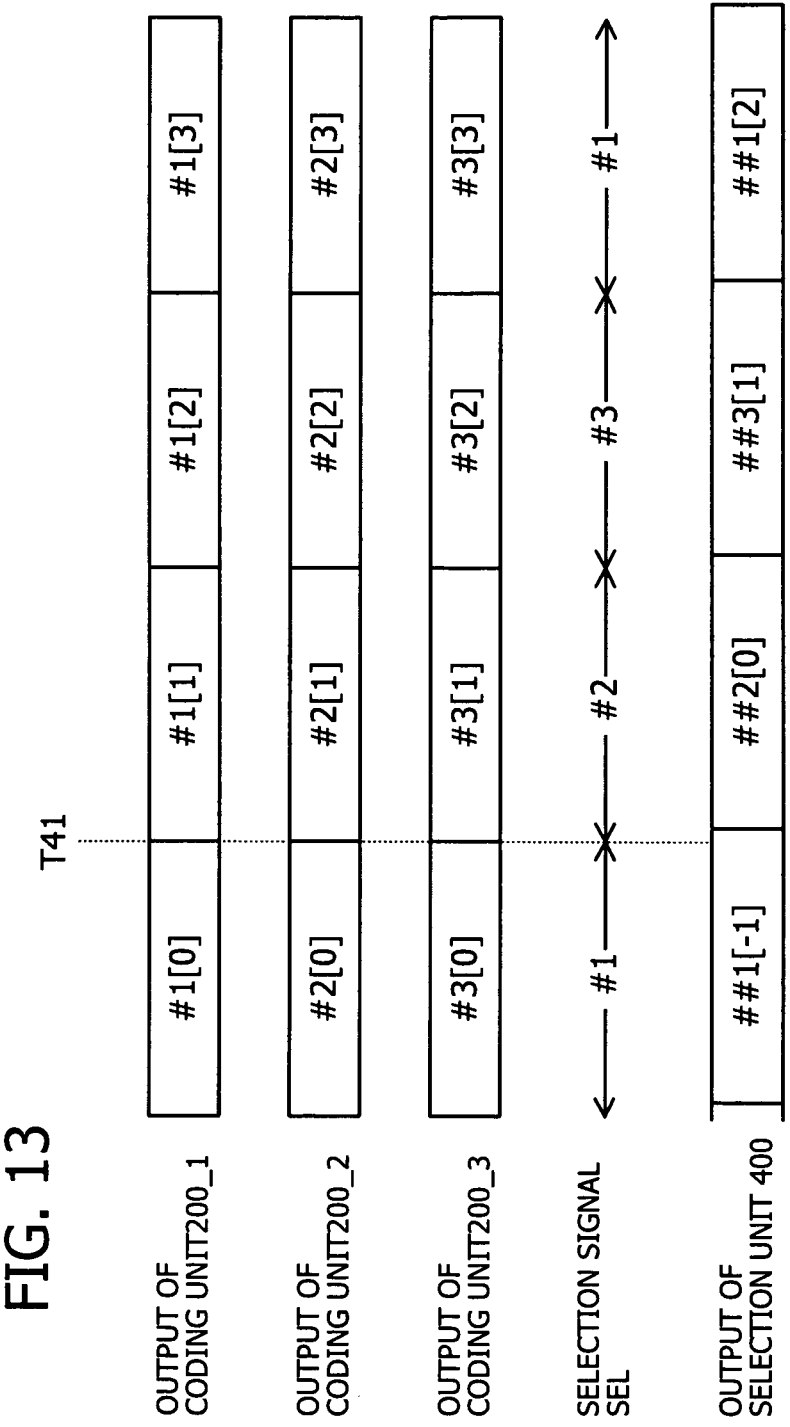
FIG. 13 illustrates a second example of output switching operations executed by a selection unit.

FIG. 13 illustrates a second example of output switching operations executed by the selection unit.

It is assumed in the example of FIG. 13 that each buffer unit 410_1, 410_2, 410_3, . . . in the selection unit 400 has a video buffer 413 with a larger capacity than the GOP data size. This means that the selection unit 400 outputs coded video data with a delay time that is longer than the duration of a GOP, with respect to the input to the selection unit 400.

As can be seen from FIG. 13, the selection signal SEL is updated at time T41, based on the costs calculated from each of GOP #1[0], GOP #2[0], and GOP #3[0]. As a result, the selection signal SEL now specifies the output of the coding unit 200_2, and the selection unit 400 selects picture group ##2[0] and starts sending it from corresponding the buffer unit 410_2.

The above processing selects and outputs picture groups corresponding to GOPs whose costs have been calculated. Although the output of coded video data has a large delay, the purposes of data reduction and picture quality improvement are still achieved.

The functions of the video coding apparatus according to the above embodiments may wholly or partly be implemented as software functions in an information processing apparatus such as a computer illustrated below.

Figure 14:
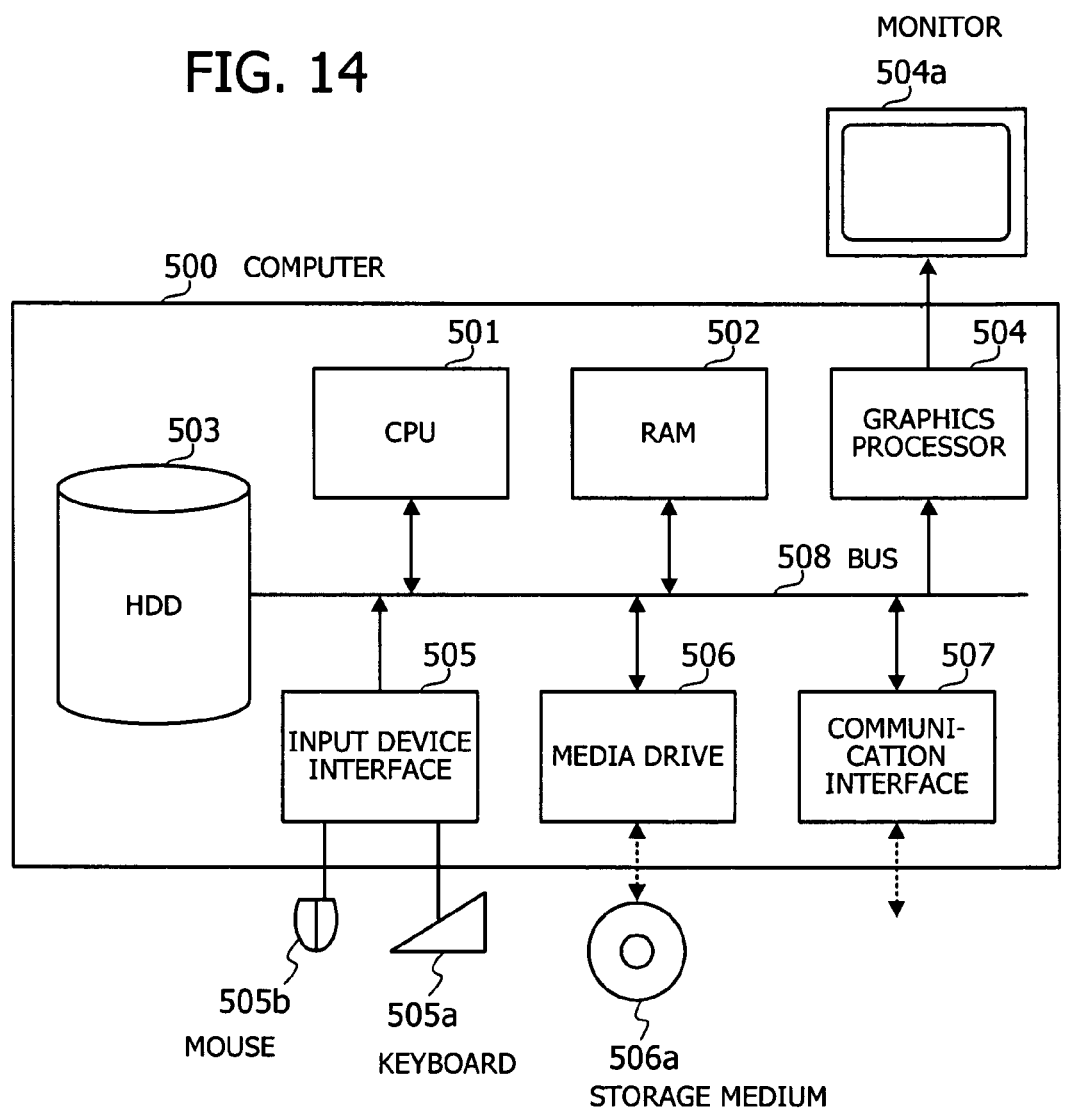
FIG. 14 illustrates an example hardware configuration of a computer used to implement the functions of the proposed video coding apparatus.

FIG. 14 illustrates an example hardware configuration of a computer used to implement the functions of the proposed video coding apparatus.

The computer 500 illustrated in FIG. 14 includes a central processing unit (CPU) 501, a random access memory (RAM) 502, a hard disk drive (HDD) 503, a graphics processor 504, an input device interface 505, a media drive 506, and a communication interface 507. Those components are interconnected by a bus 508.

The CPU 101 centrally controls this computer 500 in its entirety by executing various programs stored in the HDD 503. The RAM 502 serves as temporary storage for at least part of the programs that the CPU 501 executes, as well as for various data that the CPU 501 needs to execute the programs. The HDD 503 stores programs to be executed by the CPU 501, together with various data that the CPU 501 needs to execute the programs.

The graphics processor 504 is connected to a monitor 504a. This graphics processor 504 produces video images in accordance with commands from the CPU 501 and displays them on a screen of the monitor 504a. The input device interface 505 is connected to a keyboard 505a and a mouse 505b. This input device interface 505 receives signals from the keyboard 505a and mouse 505b and supplies them to the CPU 501 via the bus 508.

The media drive 506 reads data out of portable storage medium 506a and sends it to the CPU 501 via the bus 508. The storage medium 506a may be, for example, an optical disc. The communication interface 507 is linked to external devices via a connector (not illustrated) so as to exchange data with the external devices.

The functions discussed in the above embodiments may wholly or partly be implemented as software functions. When this is the case, one or more programs describing those processing functions are stored in, for example, the HDD 503. The CPU 501 executes those programs to provide the processing functions.

Of all the functions in the embodiments described above, the coding unit 200_1, 200_2, 200_3, . . . may be implemented as hardware circuits, and those hardware circuit may be integrated with, for example, the graphics processor 504. When this is the case, the functions of the control unit 300 and selection unit 400 may alone be implemented as software processing functions.

As mentioned above, at least part of the functions of the above video coding apparatus may be implemented on a computer. In this case, the above-described processing functions are encoded in the form of computer programs. A computer system executes those programs to achieve the described processing functions. The programs may be encoded in a computer-readable medium. Such computer-readable media include magnetic storage devices, optical discs, magneto-optical storage media, semiconductor memory devices, and the like.

For the purpose of distributing computer programs, an optical disc or other portable storage medium containing the programs is made available for sale. Network-based distribution of software programs may also be possible, in which case the program files are made available on a server computer for downloading to other computers via a network.

A computer stores the programs in its local storage device, which have previously been installed from a portable storage medium or downloaded from a server computer. The computer executes programs read out of the local storage device, thereby performing the programmed functions. Alternatively, the computer may execute program codes read out of a portable storage medium to perform the programmed functions. Another alternative method is that the computer dynamically downloads programs from a server computer when they are demanded and executes them upon delivery.

The above-described video coding apparatus produces coded video data with a high coding efficiency and a high picture quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood, that various changes, substitutions, and alterations could be made hereto without departing from the spirit and scope of the invention.

What is claimed is:

1. A video coding apparatus comprising:
a plurality of coding units to perform compression coding of a single source stream of video data by using different coding parameters;
a selection decision unit to make a selection of one of coded video data outputs encoded by the coding units on a basis of coding results of the coding units, for each picture group formed from a fixed number of successive pictures including at least one intraframe coded picture;
a selection unit to selectively output one of the coded video data outputs from the coding units according to the selection made by the selection decision unit; and
a control unit to cause the coding units to perform the compression coding in such a way that all the coding units produce respective interframe coded pictures with identical playback times as a first-coded picture in a picture group and produce identical local decoded pictures based on the respective intraframe coded pictures;
wherein the selection unit sets an output switching point at which the coded video data output of one coding unit is switched to the coded video data output of another coding unit, the output switching point being immediately before a forward interframe predictive coded picture that appears first of those in a picture group included in each of the coded video data outputs being switched.

2. The video coding apparatus according to claim 1, wherein the control unit causes the coding units to produce the identical local decoded pictures based on the respective intraframe coded pictures, by giving at least one common parameter to all the coding units when the compression coding of one picture group is finished in the coding units; and
wherein the common parameter is derived from a coding result of the coding unit corresponding to the coded video data output selected by the selection decision unit, and to be used for coding rate control in the compression coding of a topmost intraframe coded picture in a next picture group.

3. The video coding apparatus according to claim 2, wherein the common parameter for coding rate control is a target data size for the topmost intraframe coded picture in the next picture group; and wherein, upon completion of the compression coding in the coding units for one picture group, the control unit receives the target data size calculated by the coding unit corresponding to the coded video data output selected by the selection decision unit and distributes the received target data size to all the coding units for use as the target data size of the topmost intraframe coded picture in the next picture group.

4. The video coding apparatus according to claim 2, wherein the common parameter for coding rate control is an amount of data in a virtual input buffer modeling a decoding end; and wherein, upon completion of the compression coding in the coding units for one picture group, the control unit receives the amount of data in the virtual input buffer from the coding unit corresponding to the coded video data output selected by the selection decision unit and distributes the received amount of data to all the coding units for use as an amount of data in the respective virtual input buffers at a start of the compression coding of the next picture group.

5. The video coding apparatus according to claim 2, wherein the common parameter for coding rate control is a quantization step size based on the coded video data output selected by the selection decision unit; and wherein the control unit distributes, upon completion of the compression coding in the coding units for one picture group, the quantization step size to all the coding units for use as an initial quantization step size at a start of the compression coding of the next picture group.

6. The video coding apparatus according to claim 1, wherein the different coding parameters used in the compression coding by the coding units include a parameter specifying an interval of forward interframe predictive coded pictures in coded video data.

7. The video coding apparatus according to claim 1, wherein the coding units are allowed, when performing compression coding of a picture in one picture group with an interframe predictive coding method, to make reference to a picture in another picture group.

8. The video coding apparatus according to claim 1, wherein:
each of the coding units comprises:
a counting unit that increments each time a new frame is produced for reference by interframe predictive coded pictures during the compression coding, and
a data addition unit to add a count value of the counting unit to each frame in the coded video data output; and
the control unit receives the count value from the counting unit in the coding unit corresponding to the coded video data output selected by the selection decision unit and assigns the received count value to the counting unit in every coding unit, upon completion of the compression coding in the coding units for one picture group.

9. A video coding method comprising:
causing, by a control unit, a plurality of coding units to perform compression coding a single source stream of video data by using different coding parameters in such a way that all the coding units produce respective interframe coded pictures with identical playback times as a first-coded picture in a picture group and produce identical local decoded pictures based on the respective intraframe coded pictures;
making, by a selection decision unit, a selection of one of coded video data outputs encoded by the coding units on a basis of coding results of the coding units, for each picture group formed from a fixed number of successive pictures including at least one intraframe coded picture; and
selectively outputting, by a selection unit, one of the coded video data outputs from the coding units according to the selection made by the selection decision unit;
wherein the selectively outputting by the selection unit sets an output switching point at which the coded video data output of one coding unit is switched to the coded video data output of another coding unit, the output switching point being immediately before a forward interframe predictive coded picture that appears first of those in a picture group included in each of the coded video data outputs being switched.

10. A non-transitory computer-readable medium storing a video coding program that causes a computer to function as:
a plurality of coding means for performing compression coding of a single source stream of video data by using different coding parameters;
selection decision means for making a selection of one of coded video data outputs encoded by the coding means on a basis of coding results of the coding means, for each picture group formed from a fixed number of successive pictures including at least one intraframe coded picture;
selection means for selectively outputting one of the coded video data outputs from the coding means according to the selection made by the selection decision means; and
control means for causing the coding means to perform the compression coding in such a way that all the coding means produce respective interframe coded pictures with identical playback times as a first-coded picture in a picture group and produce identical local decoded pictures based on the respective intraframe coded pictures;
wherein the selection means sets an output switching point at which the coded video data output of one coding means is switched to the coded video data output of another coding means, the output switching point being immediately before a forward interframe predictive coded picture that appears first of those in a picture group included in each of the coded video data outputs being switched.

* * * * *